(12) United States Patent
Takijiri

(10) Patent No.: US 12,348,694 B2
(45) Date of Patent: Jul. 1, 2025

(54) INFORMATION PROCESSING APPARATUS AND METHOD FOR PERFORMING SERVICE PROVISION PROCESS FOR PROVIDING PRINTING SERVICE UTILIZING PRINTING DEVICE USING INDIVIDUAL INFORMATION THEREOF AND CONTRACT IDENTIFICATION INFORMATION

(71) Applicant: BROTHER KOGYO KABUSHIKI KAISHA, Nagoya (JP)

(72) Inventor: Yutaka Takijiri, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/934,776

(22) Filed: Sep. 23, 2022

(65) Prior Publication Data

US 2023/0093971 A1    Mar. 30, 2023

(30) Foreign Application Priority Data

Sep. 30, 2021   (JP) .................................. 2021-161717

(51) Int. Cl.
*H04N 1/34*     (2006.01)
*G06F 3/12*     (2006.01)
(Continued)

(52) U.S. Cl.
CPC ........... *H04N 1/346* (2013.01); *G06F 3/1201* (2013.01); *H04N 1/00244* (2013.01);
(Continued)

(58) Field of Classification Search
None
See application file for complete search history.

(56) References Cited

U.S. PATENT DOCUMENTS

2001/0034745 A1* 10/2001 Ishii ..................... G06Q 10/10
                                                          715/255
2004/0196491 A1* 10/2004 Uchino ................ G06F 3/1222
                                                          358/1.15
(Continued)

FOREIGN PATENT DOCUMENTS

JP    2021-18621 A    2/2021
JP    2021-68372 A    4/2021

*Primary Examiner* — Miya J Cato
(74) *Attorney, Agent, or Firm* — Merchant & Gould P.C.

(57) ABSTRACT

An information processing apparatus includes a communication interface and a controller. The printing device is configured to print on a printing medium. The controller is configured to perform a service provision process for providing a service utilizing a printing device. The controller is configured to perform the service provision process using individual information of the printing device and contract identification information associated with both the individual information and service information related to provision of the service. The service provision process includes: (a) registering a user in association with contract identification information associated with individual information of a first printing device; and (b) when the first printing device is replaced with a second printing device and the provision of the service is continued utilizing the second printing device, associating individual information of the second printing device with the contract identification information associated with the user registered in the (a) registering.

13 Claims, 13 Drawing Sheets

(51) Int. Cl.
*H04N 1/00* (2006.01)
*H04N 1/32* (2006.01)

(52) U.S. Cl.
CPC ..... *H04N 1/32635* (2013.01); *H04N 1/32662* (2013.01); *H04N 1/32678* (2013.01); *G06F 3/1224* (2013.01); *G06F 3/1229* (2013.01); *G06F 3/1231* (2013.01); *G06F 3/1236* (2013.01); *G06F 3/1285* (2013.01); *G06F 3/1288* (2013.01); *G06F 3/1293* (2013.01)

(56) References Cited

U.S. PATENT DOCUMENTS

| | | | |
|---|---|---|---|
| 2007/0109597 A1* | 5/2007 | Kodimer | G06Q 10/10 358/1.16 |
| 2012/0062955 A1* | 3/2012 | Tsukada | G06K 15/1803 358/1.16 |
| 2013/0016399 A1* | 1/2013 | Kobayashi | H04N 1/32122 358/1.16 |
| 2017/0094078 A1* | 3/2017 | Ohara | H04N 1/00042 |
| 2020/0301631 A1* | 9/2020 | Suda | G06F 3/1234 |
| 2020/0341695 A1* | 10/2020 | Hiraike | H04N 1/00328 |
| 2021/0208825 A1* | 7/2021 | Hirabayashi | G06F 3/1229 |
| 2022/0171583 A1* | 6/2022 | Suzuki | G06F 3/1235 |
| 2022/0171585 A1* | 6/2022 | Hattori | G06Q 10/10 |
| 2022/0374180 A1* | 11/2022 | Nakajima | G06F 3/1222 |

* cited by examiner

INITIAL CONFIGURATION SEQUENCE

LINKING SEQUENCE FOR SECOND OR SUBSEQUENT USER

NEWLY REGISTERED

NEWLY ASSOCIATED

TUTORIAL CHARGE SEQUENCE

PAID CHARGING SEQUENCE

FAILED MFP REPLACEMENT SEQUENCE
(TUTORIAL CHARGE GUARANTEE)

FAILED MFP REPLACEMENT SEQUENCE: VARIATION 1
(TUTORIAL CHARGE GUARANTEE)

FAILED MFP REPLACEMENT SEQUENCE: VARIATION 2
(TUTORIAL CHARGE GUARANTEE)

INFORMATION PROCESSING APPARATUS AND METHOD FOR PERFORMING SERVICE PROVISION PROCESS FOR PROVIDING PRINTING SERVICE UTILIZING PRINTING DEVICE USING INDIVIDUAL INFORMATION THEREOF AND CONTRACT IDENTIFICATION INFORMATION

REFERENCE TO RELATED APPLICATIONS

This application claims priority from Japanese Patent Application No. 2021-161717 filed on Sep. 30, 2021. The entire content of the priority application is incorporated herein by reference.

BACKGROUND ART

Conventionally, there have been known a printing system including a printer and a server. The printer stores a management table for tracking the number of prints that can be printed according to a printing service. The server stores and manages activation information indicating whether the printer can print without restrictions.

DESCRIPTION

When a user's printer has a malfunction or the like, for example, the user must replace this printer with a new printer. If printing services are being provided to the user at the time the printer is replaced, details of these services must be efficiently transferred to the new printer to ensure the continuation of these services. The conventional printing system described above does not sufficiently address how services are to be continued on the new printer when the current printer is replaced and thus leaves room for improvement.

In view of the foregoing, it is an object of the present disclosure to provide an information processing device and a device management method that can smoothly support the continuation of services on printing devices while one printing device is replaced with another.

In order to attain the above and other object, according to one aspect, the present disclosure provides an information processing apparatus includes a communication interface and a controller. The communication interface is for communicating with a printing device via a network. The printing device is configured to print on a printing medium. The controller is configured to perform a service provision process for providing a service utilizing the printing device. The controller is configured to perform the service provision process using individual information of the printing device and contract identification information associated with both the individual information and service information related to provision of the service. The service provision process includes: (a) registering a user in association with contract identification information associated with individual information of a first printing device; and (b) when the first printing device is replaced with a second printing device and the provision of the service is continued utilizing the second printing device, associating individual information of the second printing device with the contract identification information associated with the user registered in the (a) registering.

In the above structure, the printing device is handled using the contract identification information and the individual information. Further, when the printing device is replaced with a new printing device and the service is continued utilizing that new printing device, new individual information for the new printing device is associated with the original contract identification information. Accordingly, replacement of the printing device can be adequately and smoothly handled while continuing the service on the new printing device.

According to another aspect, the present disclosure provides an information processing apparatus including a communication interface and a controller. The communication interface is for communicating with a printing device via a network. The printing device is configured to print on a printing medium. The controller is configured to perform a service provision process for providing a service utilizing the printing device. The controller is configured to perform the service provision process using individual information of the printing device and contract identification information associated with both the individual information and service information related to provision of the service. The service provision process includes: (a) registering a user in association with contract identification information associated with individual information of a first printing device; and (b) when the first printing device is replaced with a second printing device due to a malfunction of the first printing device and the provision of the service is continued utilizing the second printing device, updating which includes: maintaining the association of the contract identification information with the user registered in the (a) registering; discarding the association of the contract identification information with the individual information of the first printing device; and associating individual information of the second printing device with the contract identification information.

According to still another aspect, the present disclosure provides a device management method for an information processing apparatus. The information processing apparatus is configured to handle a printing device using individual information of the printing device and contract identification information associated with both the individual information and service information related to provision of a service. The printing device is configured to print on a printing medium. The device management method includes: (a) registering a user in association with contract identification information associated with individual information of a first printing device; and (b) when the first printing device is replaced with a second printing device due to a malfunction of the first printing device and the provision of the service is continued utilizing the second printing device, associating individual information of the second printing device with the contract identification information associated with the user registered in the (a) registering.

According to still another aspect, the present disclosure provides a device management method for an information processing apparatus. The information processing apparatus is configured to handle a printing device using individual information of the printing device and contract identification information associated with both the individual information and service information related to provision of a service. The printing device is configured to print on a printing medium. The device management method includes: (a) registering a user in association with contract identification information associated with individual information of a first printing device; and (b) when the first printing device is replaced with a second printing device due to a malfunction of the first printing device and the provision of the service is continued utilizing the second printing device, updating which includes: maintaining the association of the contract identification information with the user registered in the (a) registering; discarding the association of the contract identification information with the individual information of the first printing device; and associating individual information of the second printing device with the contract identification information.

Figure 1:
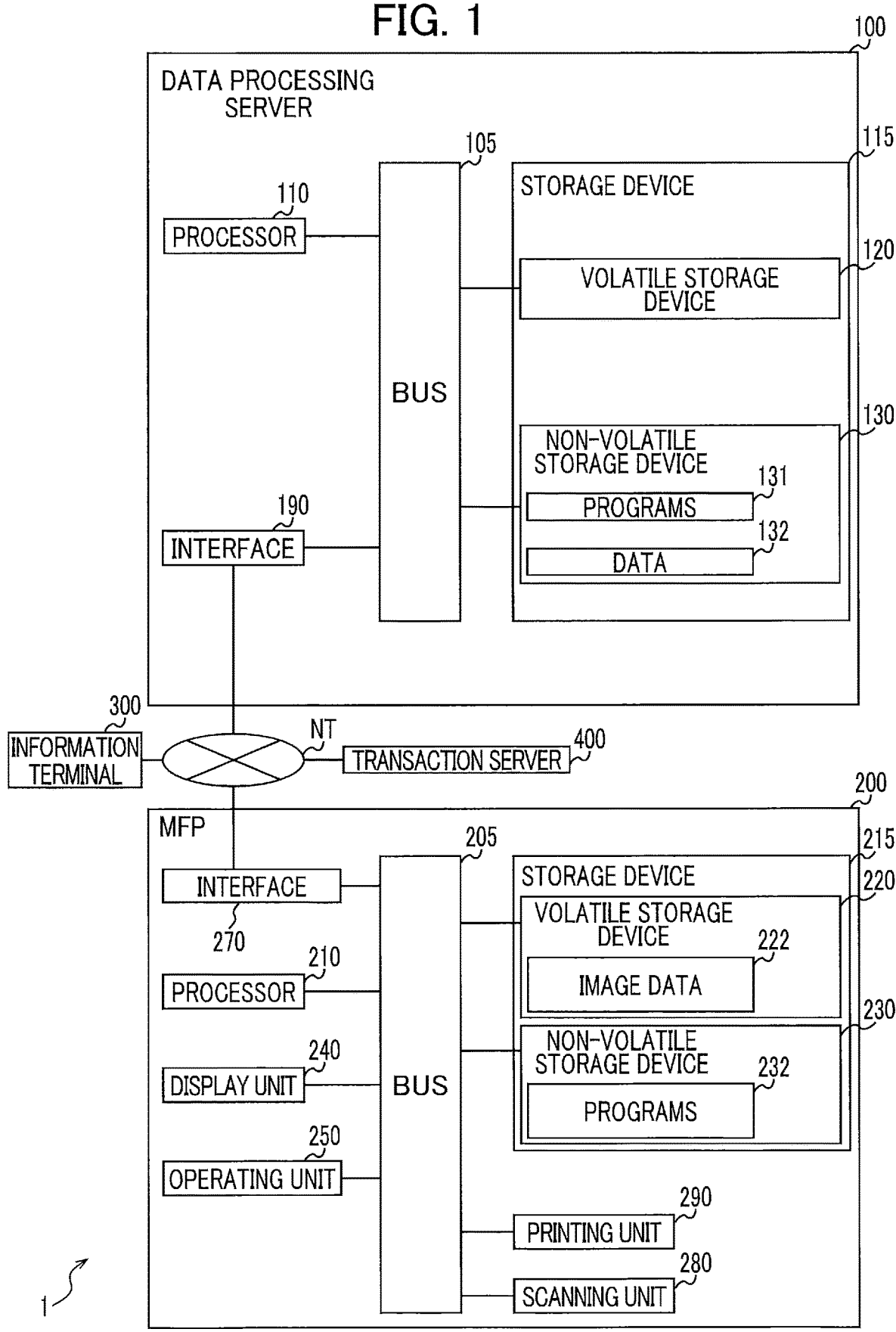
FIG. 1 is a functional block diagram illustrating the overall structure of a printing system.

FIG. 1 illustrates a printing system 1 according to one embodiment of the present disclosure. In the present embodiment, the printing system 1 provides a prepaid printing service in which users, i.e., customers can use the printing function of a multifunction peripheral 200 by paying a fee.

<1. Outline of Printing System>

The printing system 1 illustrated in FIG. 1 includes a data processing server 100, the multifunction peripheral 200, an information terminal 300, and a transaction server 400. The data processing server 100, the multifunction peripheral 200, the information terminal 300, and the transaction server 400 are interconnected over a network NT to communicate with each other.

<1-1. Data Processing Server>

The data processing server 100 is a server that is installed and managed by the manufacturer of the multifunction peripheral 200, for example. The data processing server 100 includes a processor 110, a storage device 115, and an interface 190. The processor 110, the storage device 115, and the interface 190 are interconnected via a bus 105. The data processing server 100 is an example of the information processing apparatus.

The storage device 115 includes a volatile storage device 120, and a non-volatile storage device 130. The volatile storage device 120 is a DRAM, for example. The volatile storage device 120 stores therein data for managing the multifunction peripheral 200. The non-volatile storage device 130 is a hard disk drive or a solid state drive, for example. The non-volatile storage device 130 has a program storage area 131 and a table storage area 132 for storing a data management table. The contents stored in these storage devices will be described later in detail.

The processor 110 is a device that performs data processing. The processor 110 is a CPU, for example. By executing a program stored in the program storage area 131, the processor 110 executes various processes illustrated in FIGS. 4 to 13 and the like described later, including processes for performing data communications with the information terminal 300, the multifunction peripheral 200, and the transaction server 400 which are connected to the network NT. The processor 110 is an example of the controller.

The interface 190 is a wired LAN interface or a wireless interface for communicating with other devices. The interface 190 is connected to the network NT via a wide-area communication interface (not illustrated). The interface 190 is an example of the communication interface.

<1-2. Transaction Server>

The transaction server 400 is a server that is installed at a company that provides various online services for settling online payments, for example. Although not illustrated in the drawings, the transaction server 400 includes a processor, a storage device, and an interface for connecting to the network NT.

<1-3. Multifunction Peripheral>

The multifunction peripheral 200 is owned by a service provider that provides the printing service described above, for example. The multifunction peripheral 200 includes a scanning unit 280, a printing unit 290, a processor 210, a storage device 215, a display unit 240, a user-operable operating unit 250, and a communication interface 270. The scanning unit 280, the printing unit 290, the processor 210, the storage device 215, the display unit 240, the operating unit 250, and the communication interface 270 are interconnected via a bus 205. The multifunction peripheral 200 is an example of the printing device.

The storage device 215 includes a volatile storage device 220, and a nonvolatile storage device 230. The volatile storage device 220 is DRAM, for example. The volatile storage device 220 has a data storage area 222 for storing image data. The nonvolatile storage device 230 is flash memory, for example. The nonvolatile storage device 230 has a program storage area 232. Among the various programs stored in the program storage area 232, a management process program related to execution of process sequences described later in FIGS. 4 to 6, FIGS. 9 to 13 and the like, is prestored as firmware, for example.

The processor 210 is a device that performs data processing. The processor 210 is a CPU, for example. The processer 210 executes the above-described management process program stored in the program storage area 232. The processer 210 also executes print control programs stored in the program storage area 232 for performing various print control in the multifunction peripheral 200. By executing the programs stored in the program storage area 232, the processor 210 can cause the printing unit 290 to print images based on image data transmitted from the information terminal 300.

The display unit 240 is a liquid crystal display, for example. The operating unit 250 is a device that receives user operations. By operating the operating unit 250, the user can input various instructions into the multifunction peripheral 200. The communication interface 270 is a wired or wireless network interface for communicating with other devices. The communication interface 270 is connected to the network NT via a wide-area communication interface (not illustrated).

The scanning unit 280 is configured to optically read a scanning target such as a document using photoelectric conversion elements such as a CCD or a CMOS, and to generate scan data representing an image of the read scanning target.

The printing unit 290 is configured to pick up a sheet from a feed tray of the printing unit 290 and to print an image on the sheet according to a prescribed method while conveying the sheet using a conveying mechanism (not illustrated) of the printing unit 290. The following specification describes a case in which the printing unit 290 performs printing according to an inkjet method. The sheet is an example of the printing medium.

<1-4. Information Terminal>

The information terminal 300 in the present embodiment is an information terminal (terminal device) such as a desktop personal computer, a tablet computer, or a smartphone possessed by the user. For example, the information terminal 300 is connected to the network NT through wireless communication. Although not illustrated in the drawings, the information terminal 300 includes a processor, a storage device, and an interface for connecting to the network NT. In this example, the processor of the information terminal 300 utilizes an operating system (OS) provided with universal printing capabilities, such as Mopria and AirPrint. An application program used for utilizing the printing service described above is installed in advance in the information terminal 300. The application program is executed and developed on the OS. Note that other types of information terminals may be used as the information terminal 300.

<2. Logical Devices and Physical Devices>

The printing system 1 according to the present embodiment described above provides a prepaid printing service in which users pay a fee to use the printing functions of the multifunction peripheral 200. Specifically, users (i.e., customers) can use the printing service provided on the printing system 1 according to a service contract. The printing service can be used with a multifunction peripheral 200 possessed by the provider of the printing service or purchased by the user. In the printing service, the user pre-purchases via the information terminal 300 authorization to execute a prescribed number of prints on the multifunction peripheral 200. In other words, a pay-as-you-go system is employed in the printing service in which the user can execute only the prescribed number of prints stipulated in the specific printing service that the user has ordered. In this system, the data processing server 100 directly receives an order for a printing service from the information terminal 300, the transaction server 400 indirectly handles an online payment for that order, and the printing service is applied to the multifunction peripheral 200 once payment has been settled.

Figure 2:
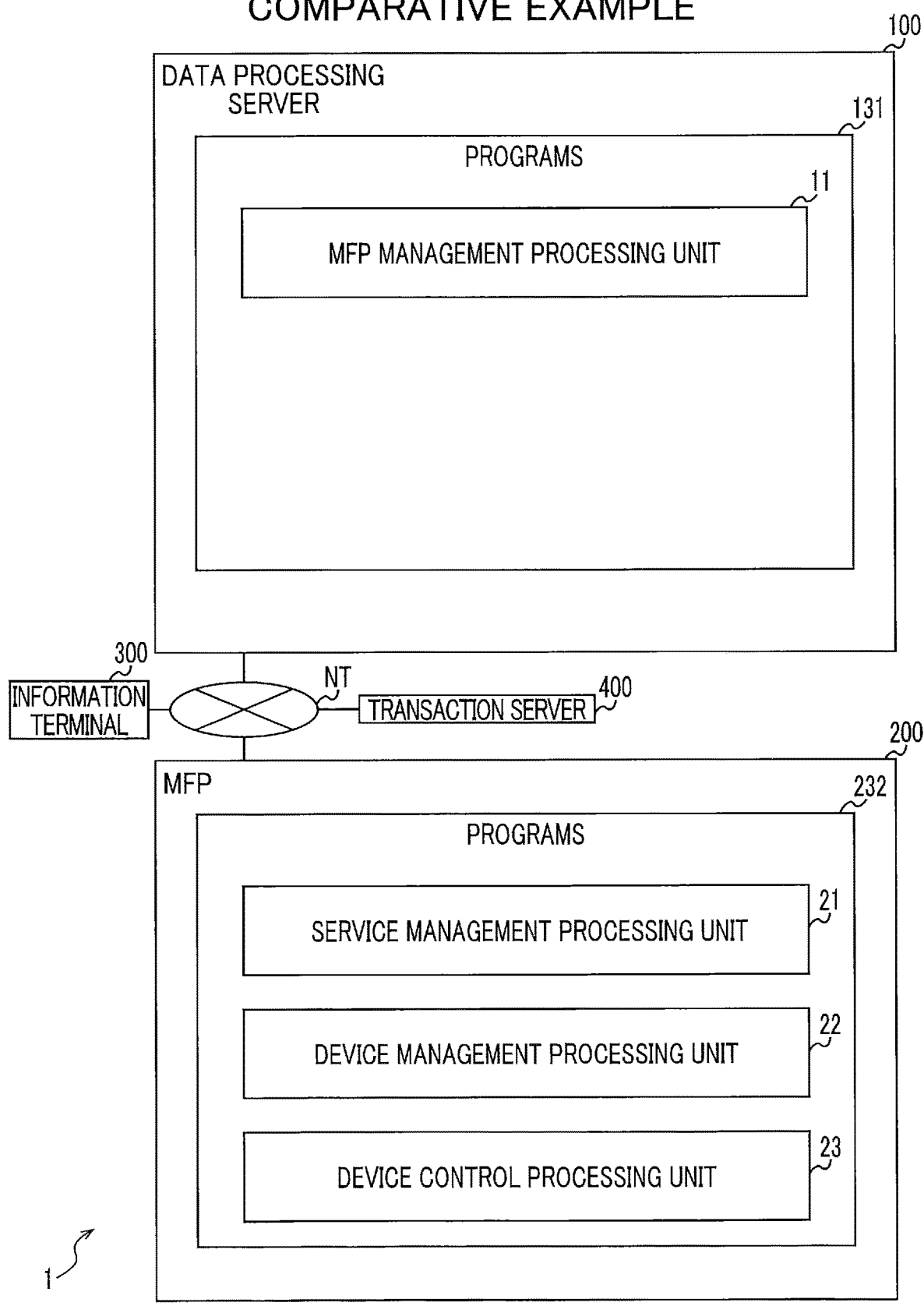
FIG. 2 is a view illustrating a sharing configuration employed in a comparative example for sharing software processes.

To coordinate the above processes for the printing service, software processes might be shared between the data processing server 100 and multifunction peripheral 200, as in the comparative example shown in FIG. 2. In the example of FIG. 2, the data processing server 100 is provided with a program corresponding to an MFP management processing unit 11, and the multifunction peripheral 200 is provided with programs corresponding to a service management processing unit 21, a device management processing unit 22, and a device control processing unit 23. The MFP management processing unit 11 of the data processing server 100 comprehensively manages information on multifunction peripherals 200 for which the data processing server 100 is responsible. The service management processing unit 21 of the multifunction peripheral 200 processes printing service orders received from contracted users of the multifunction peripheral 200 and manages related information. The device management processing unit 22 manages mechanical conditions, such as abnormalities or the status of consumables in the multifunction peripheral 200. The device control processing unit 23 performs processes related to basic device control, such as printing operations, input operations, and displaying operations on the multifunction peripheral 200. The prepaid printing service described above can be implemented even when software processing is shared between the data processing server 100 and multifunction peripheral 200, as described above. However, this shared configuration provides little freedom to configure various settings and cannot flexibly handle reconfigurations and the like when linking a device to multiple users or when transferring service to a replacement device due to a failure of the multifunction peripheral 200, as will be described later.

Figure 3:
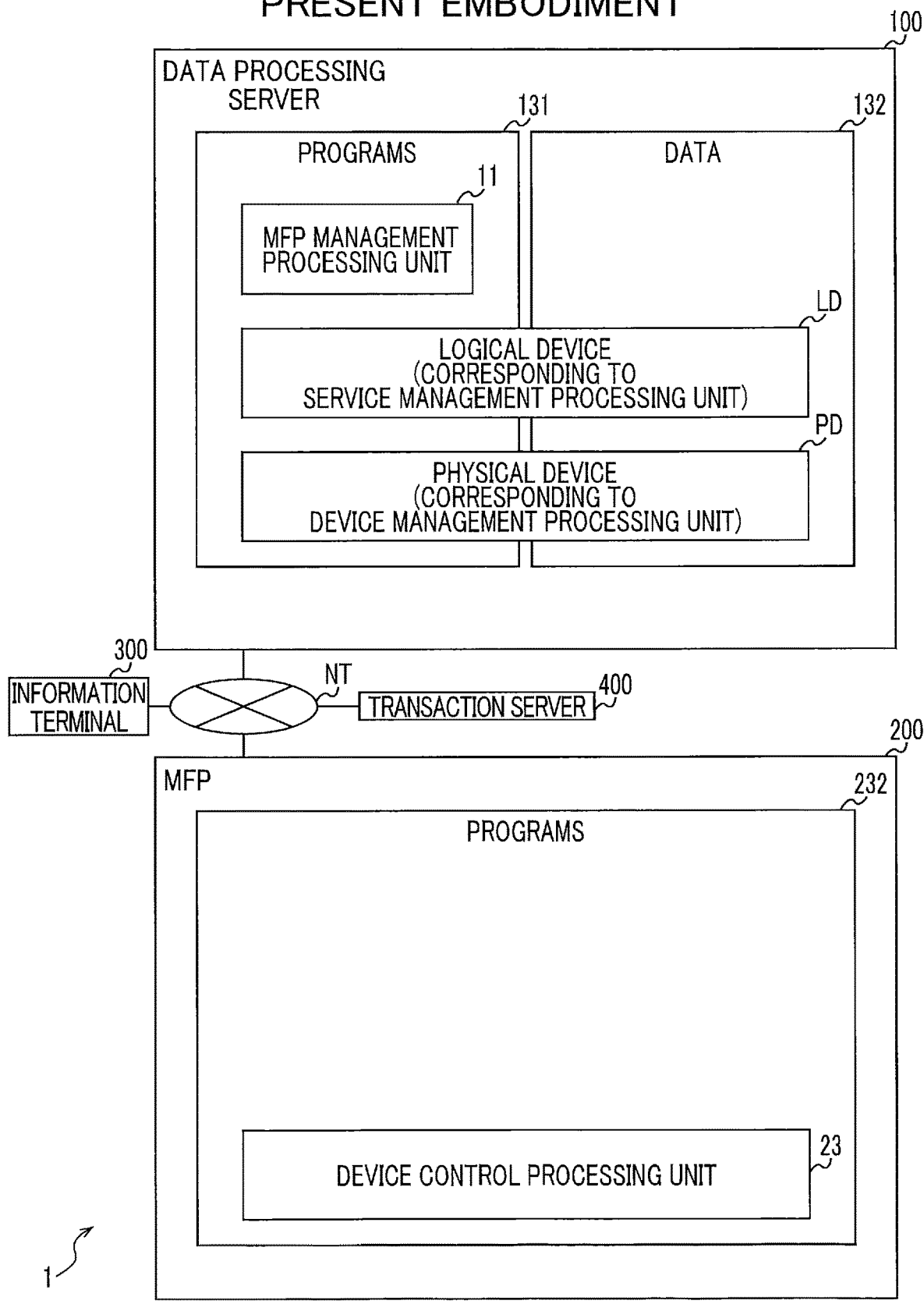
FIG. 3 is a view illustrating a sharing configuration for sharing software processes between a data processing server and a multifunction peripheral in the present embodiment.

In contrast, this embodiment employs a shared configuration, such as that shown in FIG. 3, in which the functions of the service management processing unit 21 and device management processing unit 22 for each individual multifunction peripheral 200 are implemented on the data processing server 100 side. In this case, the data processing server 100 performs service management processes (corresponding to the functions of the service management processing units 21) using logical devices LD as virtual machines not tied to any specific multifunction peripheral 200 and performs device management processes (corresponding to the functions of the device management processing units 22) using physical devices PD each of which is tied to a specific multifunction peripheral 200.

Figure 4:
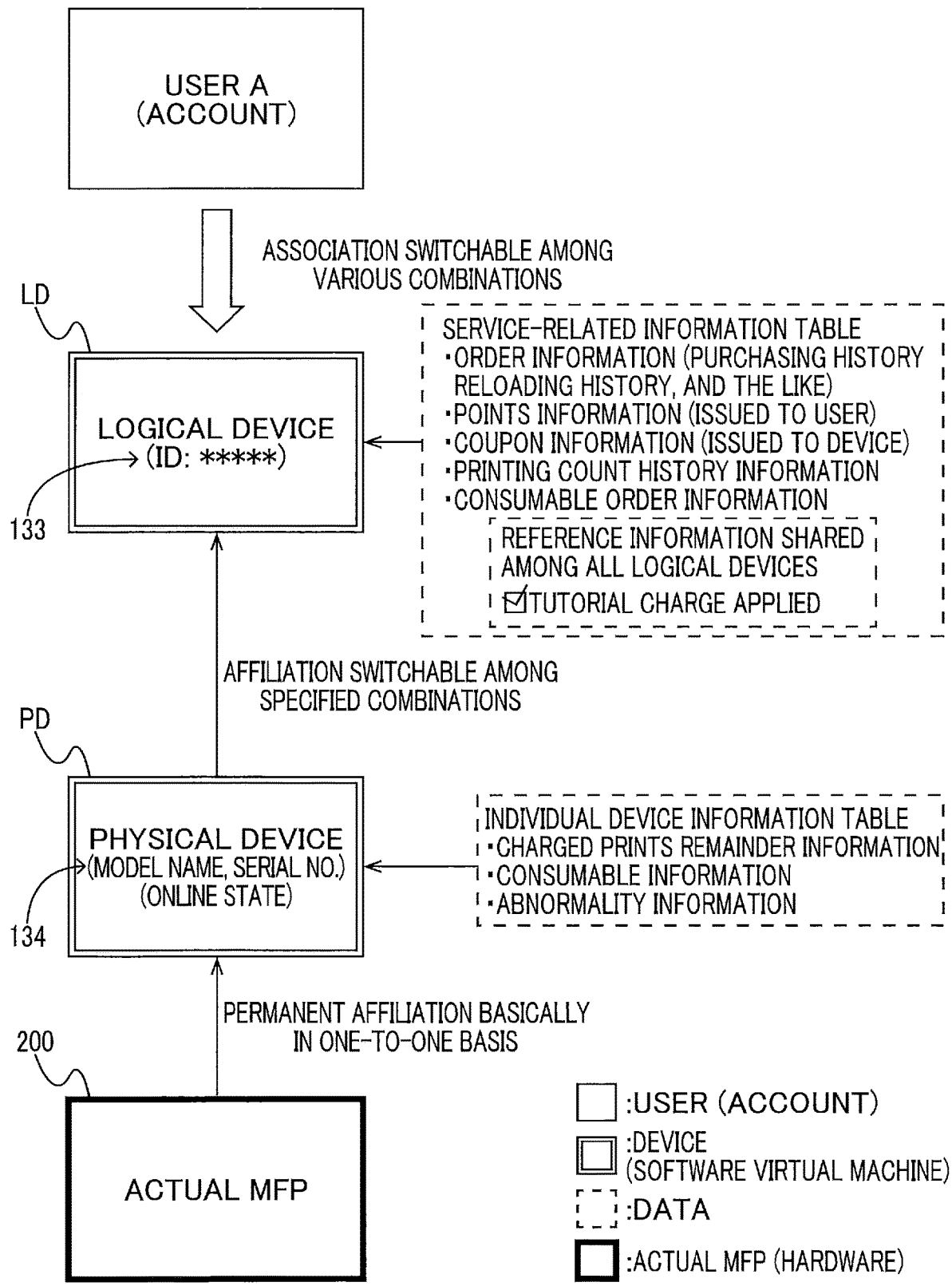
FIG. 4 is a view illustrating an example of a specific association configuration between a physical device and a logical device.

FIG. 4 shows one sample configuration of associations with the logical device LD and physical device PD. First, the logical device LD is individually identified by ID information 133 randomly set and assigned for each service contract. The ID information 133 is an example of the contract identification information. The account of a contracted user registered on the data processing server 100 is associated with this logical device LD. Note that the associations of users to logical devices LD may be modified in various ways, as will be described later.

The physical device PD holds model name and serial number information 134 for a single multifunction peripheral 200, which is the subject of management. The model name and serial number information 134 is an example of the individual information. Online status detection information for the corresponding multifunction peripheral 200 is also stored in the physical device PD. This information is used as a criterion for determining whether the corresponding multifunction peripheral 200 is currently operating normally or is in a failed state. A single multifunction peripheral 200 is permanently associated one-on-one with the physical device PD during normal operations and is in a state that allows the physical device PD to reference the mechanical conditions of the multifunction peripheral 200 in real-time (hereinafter, being in a referable state will be referred to as "affiliated"). The physical device PD is switchably affiliated with a logical device LD according to a specified combination.

The logical device LD and physical device PD are used for managing data for their respective processes. Various information related to the printing service for the user associated with the logical device LD is managed as a data table. Some specific examples of the information being managed are order information, points information, coupon information, printing count history information, consumable order information, and tutorial charge information. In this example, the user selects and orders printing authorization from among various charging services available for the multifunction peripheral 200, such as 100 yen for 100 prints and 250 yen for 300 prints. The service points equivalent to a certain percentage of the amount charged for an order is awarded. Coupons worth a certain amount of money are also issued free-of-charge at promotional events and the like. In the printing service described above, information on the order purchasing history and charging history is managed as order information; information on service points is managed as points information; and information on coupons is managed as coupon information. The printing count history information is used to manage the printing count under this printing service by tracking how many of the executable prints that the user charged (added to) for the multifunction peripheral 200 have been actually executed. The consumable order information is used to manage details of the user's past orders for consumables such as ink cartridges used in the multifunction peripheral 200.

The order information is an example of the paid-printing authorization information. The points information is an example of the free-printing authorization information. The printing count history information is an example of the printing quantity information. The consumable order information is an example of the consumable order information for consumables. The tutorial charge information is an example of the device-printing authorization information and also is an example of the complimentary printing privilege for a predetermined amount of printing.

In addition to the paid orders and the use of coupons described above, the printing service in this example offers a tutorial charge as one form of charging executable prints (adding to printing credit) for the multifunction peripheral 200. This tutorial charge is a one-time only charging authorization provided either free-of-charge or at a substantial discount for business purposes. The tutorial charge is intended for users who are using a new multifunction peripheral 200 for the first time, enabling the users to learn how to perform operations for charging (adding to) executable prints (printing credit) or ensuring that their initial use of the multifunction peripheral 200 goes smoothly. In this embodiment, application of the service points and coupons described above can be freely set to individual users, logical devices LD, or physical devices PD (multifunction peripherals 200). However, the tutorial charge can be applied only once per service contract (or purchase) of a multifunction peripheral 200 for the reasons described above. Tutorial charge information indicates whether the tutorial charge has already been applied and can be shared among and referenced by a plurality of logical devices LD, as will be described later.

Various information related to mechanical conditions on the single multifunction peripheral 200 affiliated with the physical device PD is managed as a data table. Specifically, the information managed in this table includes charged prints remainder information, consumable information, and abnormality information. The charged prints remainder information is used to manage the number of remaining executable prints that can be executed from among the prints charged by the user for the affiliated multifunction peripheral 200. The consumable information is used to manage the remaining quantities and statuses of consumables in the multifunction peripheral 200, such as ink cartridges. The abnormality information is used to manage unauthorized operations on the multifunction peripheral 200 or abnormalities and failures that have occurred in the multifunction peripheral 200.

<3. Configuration of Associations and Affiliations>

In the present embodiment, the data processing server 100 performs centralized processing using logical devices LD for managing information related to printing services and physical devices PD for managing the mechanical status of corresponding multifunction peripherals 200, as described above. This method improves flexibility in various settings and also facilitates the linking of users to logical devices LD and the reconfigurations performed when a user transfers service to a replacement device due to failure of the current multifunction peripheral 200, as will be described later.

Figure 5A:
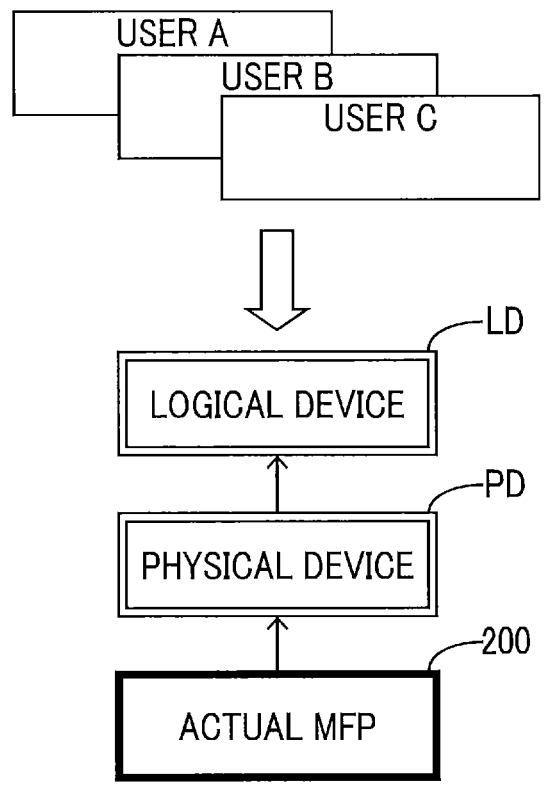
FIG. 5A is a view illustrating an association configuration for a case in which two or more users commonly use a single multifunction peripheral.

The example shown in FIG. 4 shows a case in which one user A manages printing services on a single multifunction peripheral 200. Here, the account for this user A has a one-on-one association with a single corresponding logical device LD. However, a plurality of users A, B, and C may be associated with a single logical device LD, as illustrated in FIG. 5A, enabling users A, B, and C to collectively manage the same service contract for a single multifunction peripheral 200. In this case, the application of service points and coupons described above may be configured individually for each user or may be set for the logical device LD as a unit to be commonly available to all users.

Figure 5B:
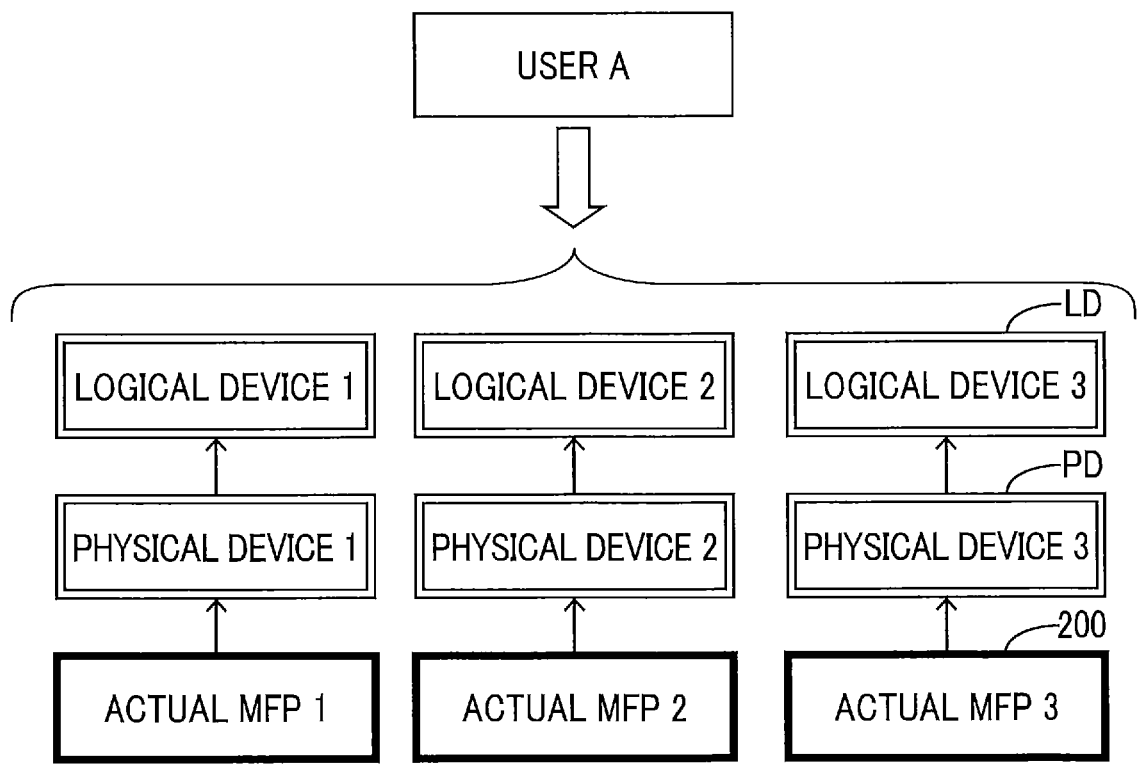
FIG. 5B is a view illustrating an association configuration for a case in which a single user uses two or more multifunction peripherals.

Alternatively, the account of a single user A may be associated with a plurality of logical devices LD, as illustrated in FIG. 5B, enabling one user to manage printing services on a plurality of multifunction peripherals 200. In this case, the service points and coupons described above may be applied to the user and made available for all multifunction peripherals 200, or may be applied to each individual logical device LD and made available for each multifunction peripheral 200 on an individual basis.

Note that the tutorial charge may only be applied once per service contract for the multifunction peripheral 200, even in the cases of FIGS. 5A and 5B, for the reasons described above. Therefore, tutorial charge information, i.e., reference information indicating whether the tutorial charge was applied needs to be shared for reference among all logical devices LD associated with a single service contract.

Figure 6:
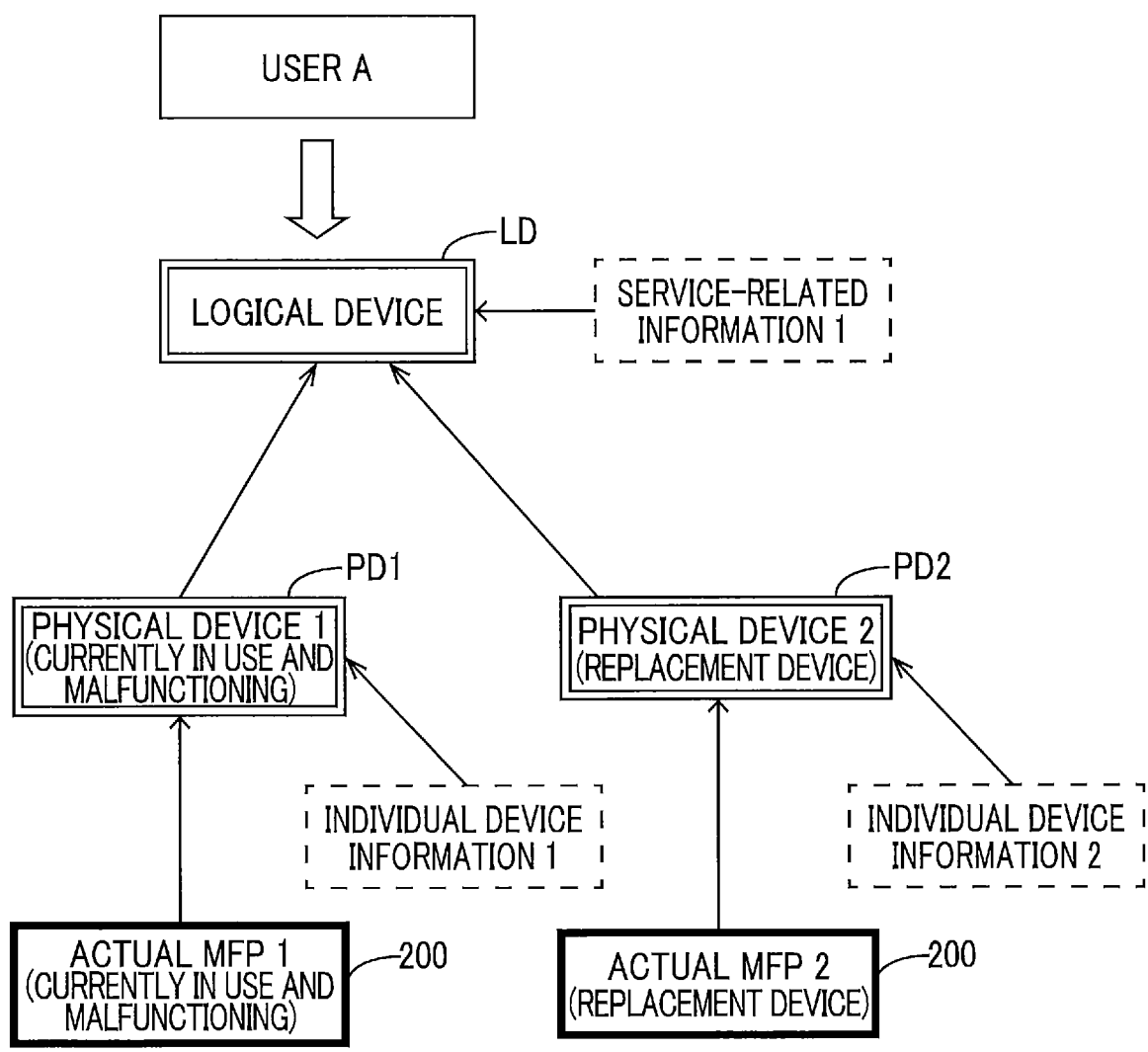
FIG. 6 is a view illustrating an association configuration when replacing a multifunction peripheral and transferring services from that device to a replacement device.

Further, in the event that the multifunction peripheral 200 malfunctions, the user need only contact the service provider to have the provider replace the multifunction peripheral 200 with a replacement device. Since the physical device PD corresponds to an individual multifunction peripheral 200 in this embodiment, the data processing server 100 prepares a new physical device PD2 for the replacement MFP 2 that is separate from the physical device PD1 corresponding to the failed MFP 1, as shown in FIG. 6. Then, the affiliations for the physical devices PD1 and PD2 are set such that the physical device PD2 is affiliated with the logical device LD with which the physical device PD1 has been affiliated and the affiliation of the physical device PD1 with that logical device LD is discarded. Separately configuring the physical devices PD and logical devices LD in this way facilitates systematic reconfiguration in the data processing server 100 when replacing a failed MFP 1 with a replacement MFP 2.

That is, this method only changes the affiliations of the physical devices PD1 and PD2 that reference individual device information 1 and 2 for the MFPs 1 and 2 being exchanged, whereby the logical device LD and the service-related information 1, which is reference information for the logical device LD, are not affected in any way. The service-related information 1 is an example of the first service information. The process to register the service-related information 1 in association with the logical device LD is an example of the (c) registering.

<4. Various Process Sequences>

Next, specific steps in various sequences performed on the data processing server 100 of the present embodiment will be described in detail below while referring to the sequence diagrams in FIGS. 7 through 11. These sequences are respectively performed during the initial configuration for a new multifunction peripheral 200, when linking a second or subsequent user to the multifunction peripheral 200, when applying the tutorial charge, when applying the paid charge, and when a failed multifunction peripheral 200 is replaced. In the following drawings, the multifunction peripheral 200 and various reference information are depicted as necessary and omitted in other cases as appropriate.

<4-1. Sequence for an Initial Configuration>

When the user introduces and installs a multifunction peripheral 200 through a new service contract, the multifunction peripheral 200 is first connected to the data processing server 100 via the network NT. While not shown in the drawing, no information related to the multifunction peripheral 200 is stored on the data processing server 100 until this connection has been established.

Figure 7A:
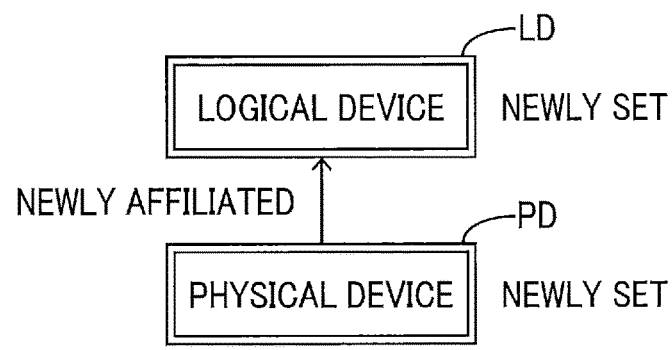
FIGS. 7A to 7C are views for explaining a sequence for an initial configuration.

Once the multifunction peripheral 200 has been connected, the data processing server 100 registers a new physical device PD that receives and references individual device information from the multifunction peripheral 200, and a new logical device LD to which the physical device PD is affiliated, as illustrated in FIG. 7A.

Figure 7B:
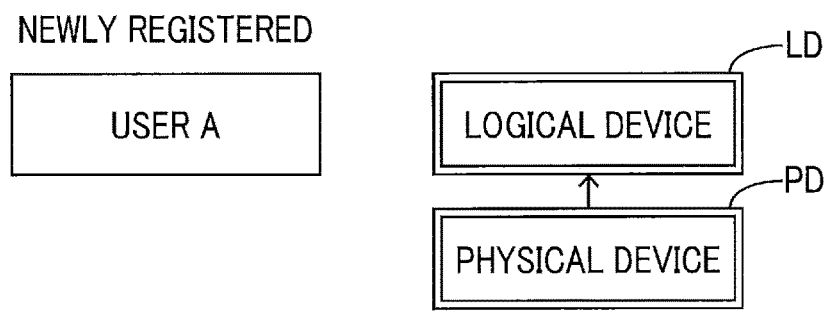

Next, user A accesses a prescribed registration website using the information terminal 300 and performs a procedure to register an account for user A on the data processing server 100, as illustrated in FIG. 7B.

Figure 7C:
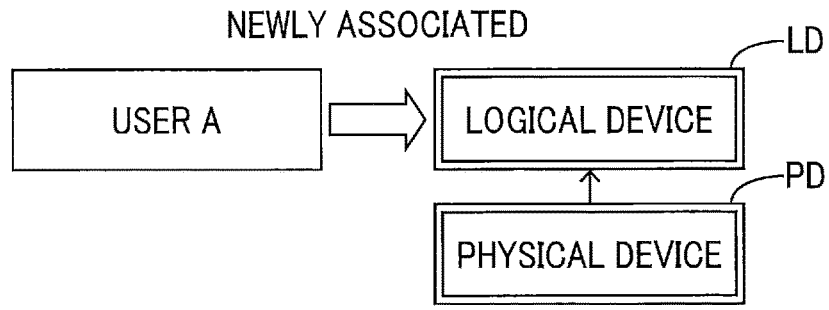

Next, user A verifies the model name and serial number of the multifunction peripheral 200 and the like to link the account for user A to the corresponding logical device LD, as illustrated in FIG. 7C. After completing the initial configuration described above, user A can begin using the printing service. This process to register the account for user A in association with the logical device LD is an example of the (a) registering.

<4-2. Sequence for Linking a Second or Subsequent User>

Figure 8A:
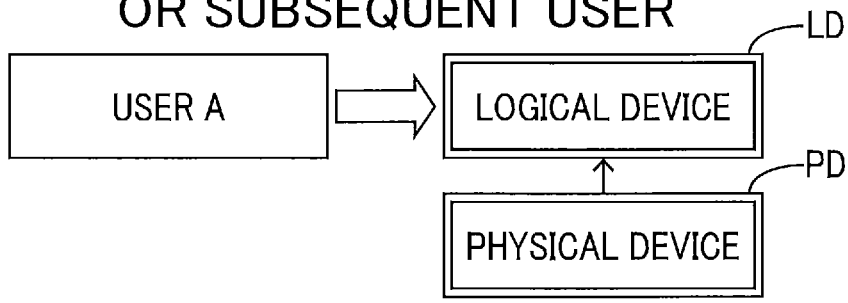
FIGS. 8A to 8C are views for explaining a sequence for linking a second or subsequent user.
Figure 8B:
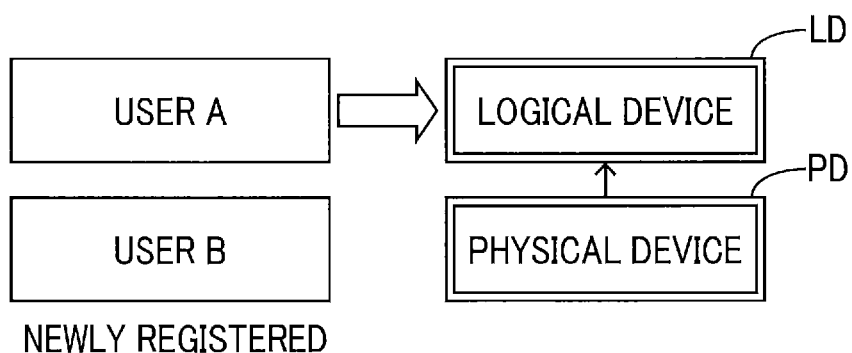
Figure 8C:
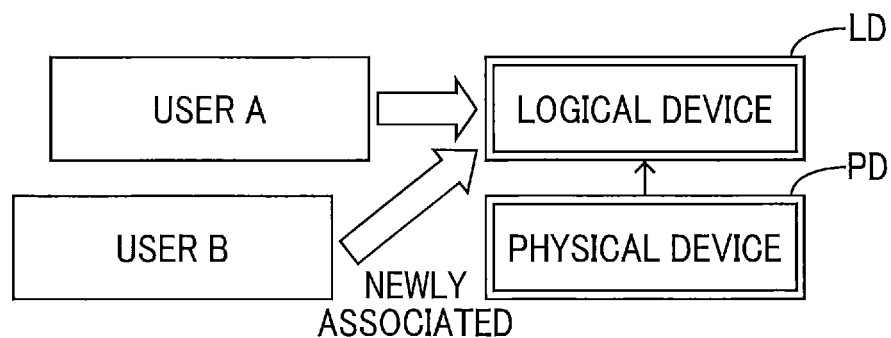

While only one user, user A, is associated with the logical device LD, as illustrated in FIG. 8A, only this user A is able to manage printing services using the multifunction peripheral 200. However, if another user B also wishes to manage printing services using the same multifunction peripheral 200, user B must first register an account corresponding to user B through the same procedure on the registration website described above, as illustrated in FIG. 8B. By verifying the model name and serial number of the multifunction peripheral 200 and the like, as described above, user B links the account for user B to the same logical device LD, so that accounts for both user B and user A are associated with a common logical device LD, as illustrated in FIG. 8B. This enables both user A and user B to manage printing services using the same multifunction peripheral 200 through the same logical device LD.

<4-3. Sequence for Applying the Tutorial Charge>

Next, a sequence for applying a tutorial charge plan will be described with reference to FIGS. 9A to 9C. In this embodiment, a tutorial charge plan has been prepared in advance to be used only once when a user establishes a new service contract for the multifunction peripheral 200. In this example, the tutorial charge plan is a free charging authorization that requires no payment from the user and adds a predetermined number of executable prints.

Figure 9A:
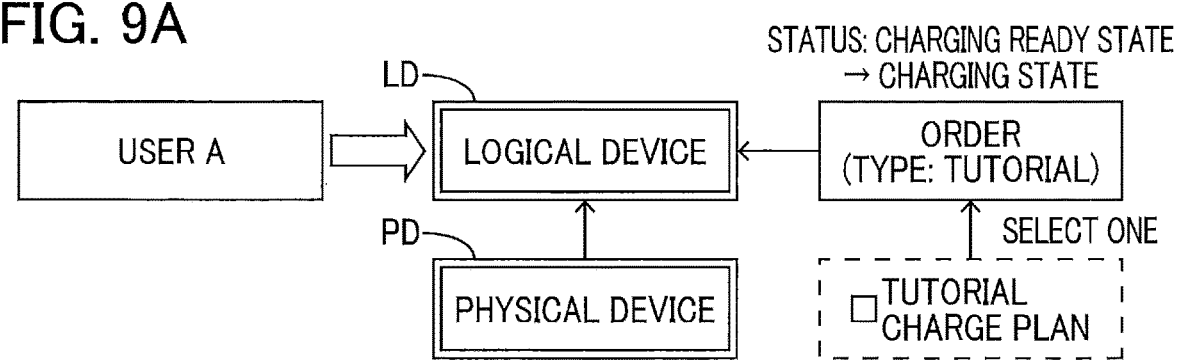
FIGS. 9A to 9C are views for explaining a sequence for a tutorial charge.
Figure 9B:
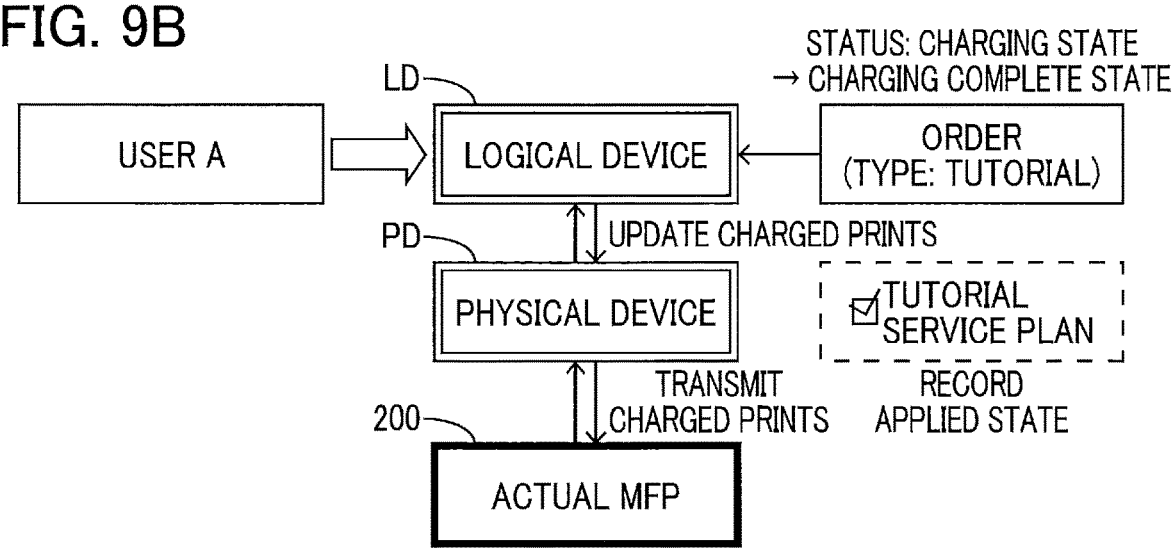

When user A issues an instruction via the information terminal 300 to use this tutorial charge plan, the data processing server 100 selects only one tutorial charge plan from among the multiple printing service plans stored on the data processing server 100 and applies this plan to an order processing unit, as illustrated in FIG. 9A. The order processing unit is part of the control unit in the data processing server 100. If flag information shown in FIG. 4 for the tutorial charge flag indicates that the plan has not yet been applied at this time, and specifically when the flag has not been set (i.e., a check has not been inserted in the checkbox in the drawings), the data processing server 100 applies the tutorial charge plan to the order processing unit. However, if the flag indicates that the tutorial charge plan has been applied, the data processing server 100 refrains from applying this plan to the order processing unit. If the tutorial charge plan is applied, the order processing unit switches from its previous charging ready state to a charging state and applies the service details set in the tutorial charge plan, i.e., a predetermined number of executable prints, to the logical device LD.

Next, the data processing server 100 updates charged prints remainder information for the physical device PD by increasing this charged remainder by the number of executable prints indicated in the tutorial charge plan. This number of charged executable prints is also transmitted to the actual MFP to which the physical device PD is affiliated. As a result, the multifunction peripheral 200 increases the permitted number of executable prints by the number added from the tutorial charge plan. Next, the order processing unit switches from the charging state to a charging complete state and sets the tutorial charge flag to record the applied status for this tutorial charge (a checkmark is inserted into the checkbox in the drawing).

Figure 9C:
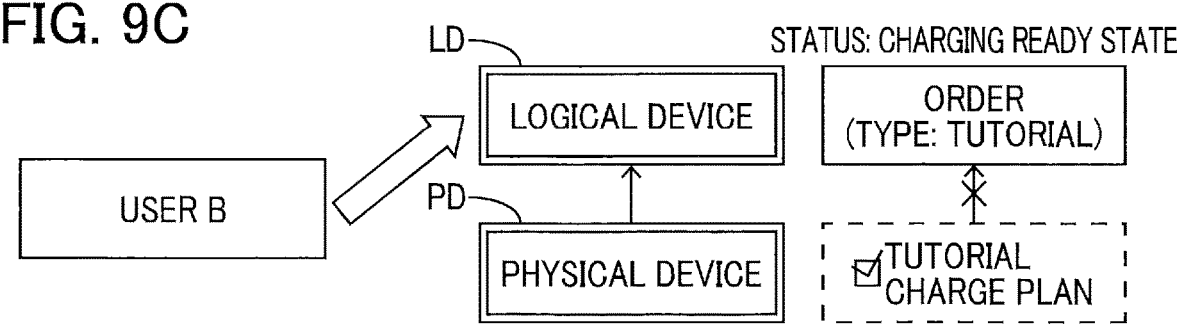

If user A who used the tutorial charge plan or another user B covered under the same service contract subsequently issues an instruction to apply the tutorial charge plan, the order processing unit refuses to apply this plan based on the applied state that has been recorded, as illustrated in FIG. 9C. Further, since the recording of this applied status is never modified thereafter, the tutorial charge plan cannot be applied more than once to the same multifunction peripheral 200.

<4-4. Paid Charging Sequence>

Next, a sequence of a paid charging process will be described with reference to FIGS. 10A to 10C. In this process, the user uses a paid charging plan to increase the number of executable prints. Although not shown in the drawings, a plurality of types of selectable paid charging plans are prepared on the data processing server 100.

Figure 10A:
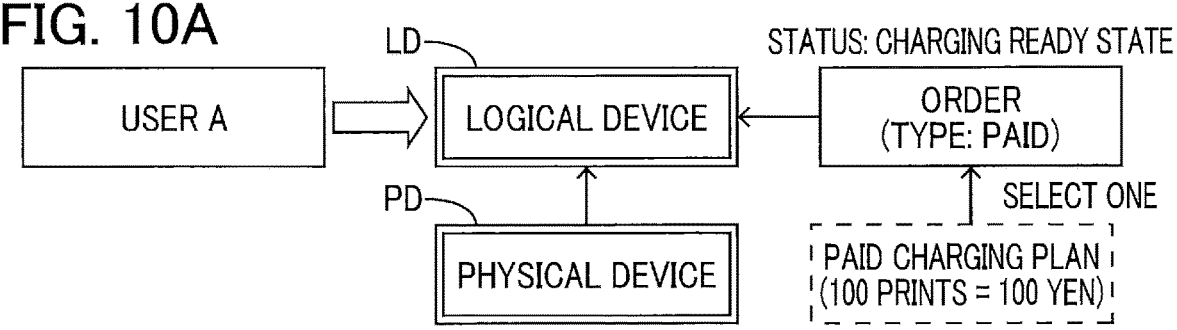
FIGS. 10A to 10C are views for explaining a sequence for a paid charge.

When user A selects a specific charging plan via the information terminal 300 and issues an instruction to purchase and use this plan, the control unit of the data processing server 100 performs the process illustrated in FIG. 10A. That is, the data processing server 100 selects only the paid charging plan selected by the user from among the printing service plans stored on the data processing server 100 (the 100 prints for 100 yen plan in this example) and applies this charging plan to the order processing unit.

Figure 10B:
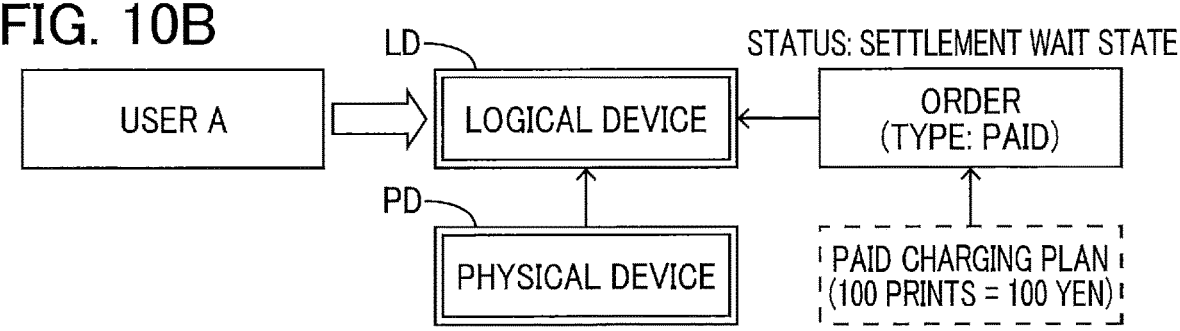

When charging, as in this case, the order processing unit does not immediately apply the prescribed number of executable prints to the logical device LD but waits until the user has completed payment for the paid charging plan via the separate transaction server 400, as illustrated in FIG. 10B.

Figure 10C:
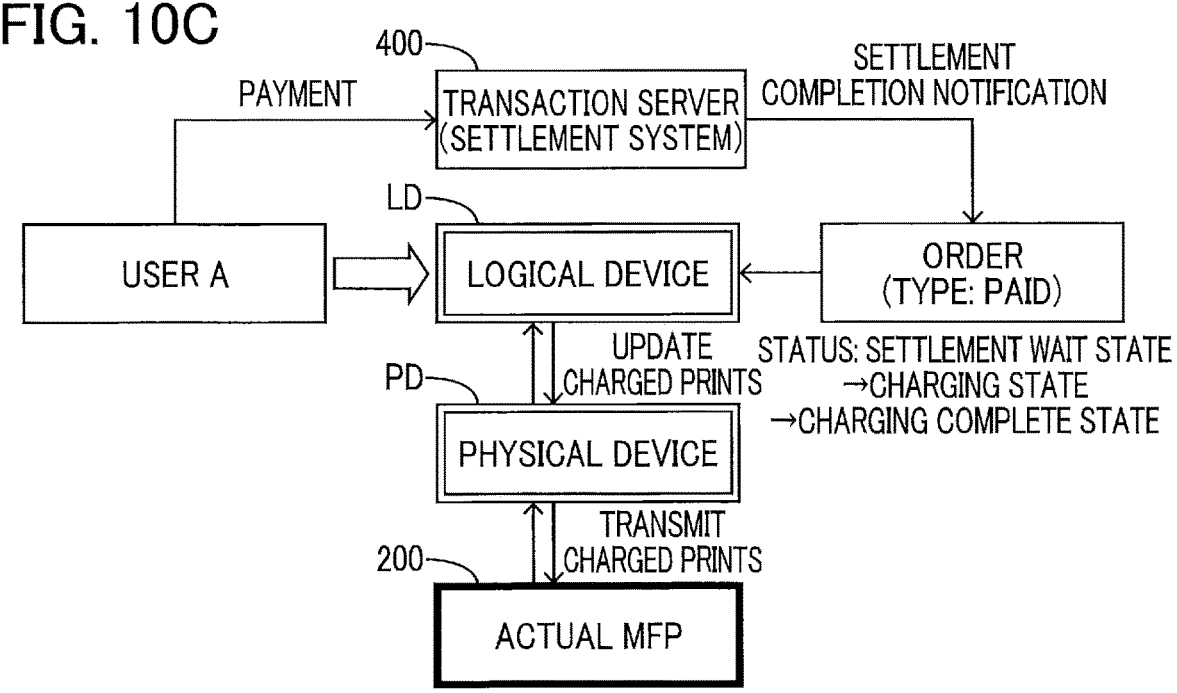

Once the user has completed the payment procedure and the transaction server 400 has notified the order processing unit that settlement is complete, as illustrated in FIG. 10C, the order processing unit shifts from its current settlement wait state to the charging state. At this time, the order processing unit applies the number of executable prints specified in the paid charging plan to the logical device LD and subsequently shifts to a charging complete state. Thereafter, as in the case of the tutorial charge shown in FIG. 9B, the data processing server 100 updates the charged prints remainder information for the physical device PD by adding the charged amount. The data processing server 100 also transfers the number of charged executable prints to the MFP with which the physical device PD is affiliated. This enables user A to order a paid charging plan of the user's choice in order to add executable prints of the corresponding charging amount for the multifunction peripheral 200.

Service points described above are generated and managed and coupons are issued based on their accumulation through suitable processes performed between the data processing server 100 and transaction server 400. Coupons, which are complimentary ordering privileges, are registered on the data processing server 100 so that the user can select the coupon as a type of charging plan. When the user uses a coupon, the order processing unit immediately applies the number of executable prints corresponding to the coupon's value to the logical device LD without waiting for payment and records information in the logical device LD indicating that the coupon was applied (not shown).

<4-5. Replacement Sequence for a Malfunctioning MFP>

Next, the reconfiguration sequence performed when the multifunction peripheral 200 currently in use malfunctions and thus is replaced with a replacement device. This example assumes that some of the executable prints charged when applying the tutorial charge plan still remain unused at the time of replacement. Accordingly, this charged remainder (the remaining executable prints) is guaranteed for the replacement device.

Figure 11A:
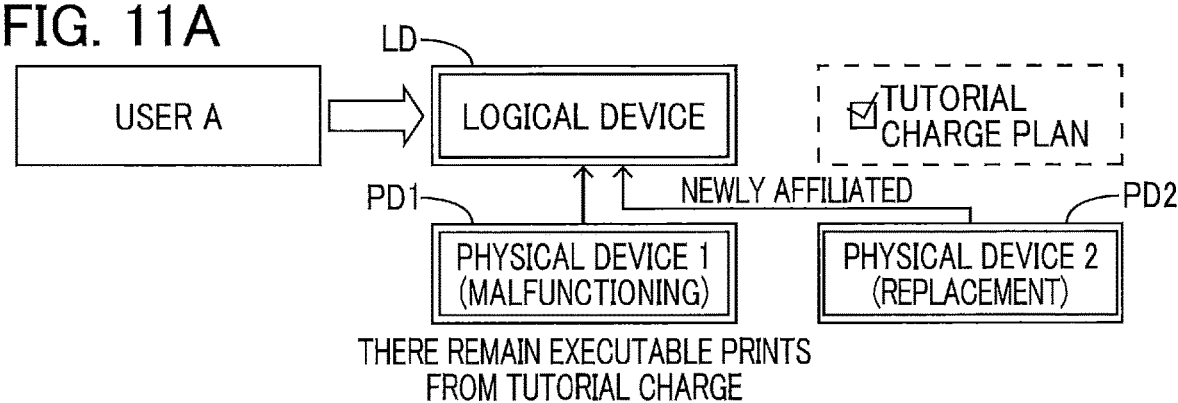
FIGS. 11A to 11C are views for explaining a failed multifunction peripheral replacement sequence.

When the MFP 1 currently in use malfunctions, the MFP 1 is sent to an appropriate repair center of the manufacturer. This repair center issues a transfer coupon based on information, such as the charged remainder recorded on the failed MFP 1 and, depending on the internal information and failed status of the MFP 1, a user report. In the meantime, the data processing server 100 generates a new physical device PD2 to which an MFP 2 is affiliated, so that two physical devices PD1 and PD2 are temporarily affiliated with the same logical device LD, as illustrated in FIG. 11A. At this time, preparations for the reconfiguration are complete, and the printing service provider ships the MFP 2 as the replacement device, and then the MFP 2 is reinstalled at the user's location. In this example, the tutorial charge information which the logical device LD references is recorded to indicate that the tutorial charge has been applied, as described above, and the physical device PD1 for the failed device holds the remaining number of executable prints for the applied tutorial charge as charged prints remainder information.

Figure 11B:
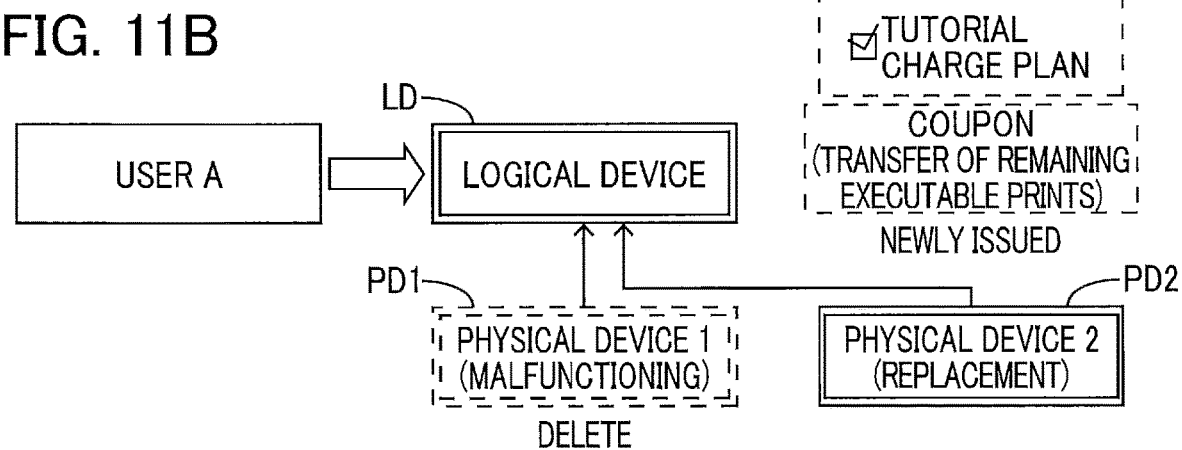

If no transfer coupon has been issued at this time, reconfiguration for this replacement is complete simply by disabling the affiliation between the physical device PD1 and the logical device LD while preserving the physical device PD1 for investigation. However, when a transfer coupon has been issued, this coupon is applied to the logical device LD in order to transfer the charged remainder, as illustrated in FIG. 11B. In particular, a special type of coupon needs to be issued for the charged remainder charged with the tutorial charge application since the charged remainder charged with the tutorial charge application means the charged remainder charged with a plan that cannot be applied a second time. The repair center issues such a coupon for transferring the charged remainder after confirming the precise number of executable prints remaining for the failed MFP 1.

Figure 11C:
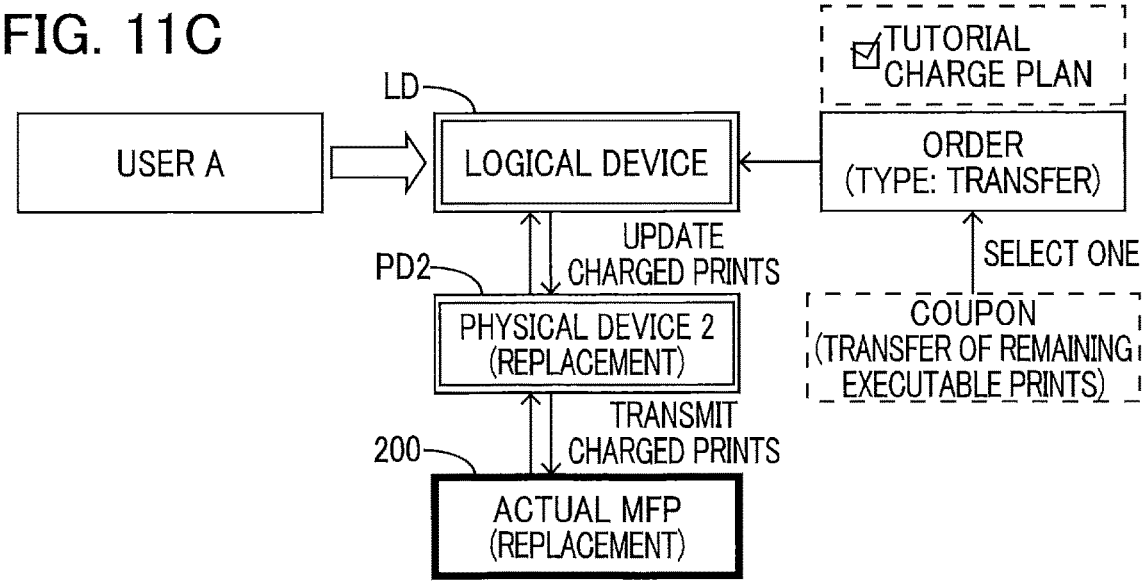

The user can select and apply the transfer coupon issued for the charged remainder via the information terminal 300. When operations to select and apply the transfer coupon are performed, the order processing unit applies this coupon, as shown in FIG. 11C, so that charging of the corresponding number of executable prints is applied to the logical device LD. Next, as in other charging sequences, the data processing server 100 updates the number of charged executable prints for the new physical device PD2, and the data processing server 100 transfers the charged number to the replacement MFP 2. In this way, even when a failed device is replaced with a replacement device while executable prints still remain from the application of the tutorial charge, the printing service can still guarantee the remaining executable prints for use on the replacement device.

Note that it is possible to omit the above-described issuance of a coupon and user operations for selecting and applying the coupon from the system process by having the data processing server 100 automatically charge a number of executable prints equivalent to the remaining executable prints. However, the advantage of issuing a transfer coupon and having the user select and apply the coupon in the above example is that the user can clearly confirm that the charged remainder is guaranteed. Further, the issuance of a transfer coupon and the guarantee of the charged remainder through automatic charging is not limited to the number of executable prints remaining from the application of the tutorial charge but may also be performed for charged remainder from the applications of other charging plans and coupons.

The failed MFP 1 is an example of the first printing device. The replacement MFP 2 is an example of the second printing device. The process to affiliate the physical device LD2 with the logical device LD is an example of the (b) associating. The information on the remaining executable prints recorded in the physical device PD1 is an example of the unused service information. The transfer coupon is an example of the second service information. The process to issue and register the transfer coupon such that the issued transfer coupon can be applied to the logical device LD is an example of the (d) generating and the (e) registering. The state in which the tutorial charge information indicates the tutorial charge has not yet been applied is an example of the first complimentary printing privilege. The number of executable prints remaining from the applied tutorial charge is an example of the unprinted quantity. The process to acquire this remaining number of executable prints is an example of the (f) acquiring.

<5. Effects of the Embodiment>

As described above, the processor 110 in the data processing server 100 provided in the printing system 1 of the present embodiment handles the multifunction peripheral 200 using the physical device PD identified by the model name and serial number information 134, and the logical device LD identified by the ID information 133, which is associated with the physical device PD. The physical device PD is a concept associated with the individual device information for the multifunction peripheral 200. The logical device LD is a concept associated with service-related information for the provision of services utilizing the multifunction peripheral 200. By performing a process to register a user account in association with the logical device LD, the processor 110 links the user to the logical device LD associated with this service-related information.

When an MFP 1 malfunctions and is replaced by a different MFP 2, for example, the services provided to the MFP 1 are passed on to the MFP 2. In the present embodiment, a physical device PD2, which is separate from the physical device PD1 for the MFP 1, is generated for the MFP 2 when replacing and transferring services from the MFP 1 to the MFP 2 (i.e., when the MFP 1 is replaced and the provision of the services is continued utilizing the MFP 2). Through a process executed by the processor 110, the physical device PD2 is associated with the logical device LD associated with the service-related information so as to be affiliated with this logical device LD.

The data processing server 100 according to the present embodiment views a multifunction peripheral 200 as being conceptually divided into a logical device LD associated with service-related information and a physical device PD based on individual device information and, when the multifunction peripheral 200 is replaced and services are transferred to the new device, the data processing server 100 associates a new physical device PD2 with the logical device LD such that the new physical device PD2 is affiliated with the logical device LD. Thus, the data processing server 100 according to the present embodiment can adequately and smoothly support the continuation of services on multifunction peripherals 200 while one multifunction peripheral 200 is replaced with another.

A particular feature of this embodiment is that service-related information 1 is associated with the logical device LD for the MFP 1 before the MFP 1 is replaced and is associated with the logical device LD linked to the MFP 2 following this replacement.

According to the present embodiment, when the multifunction peripheral 200 is replaced and services are passed on to a new device (i.e., services are continued utilizing the new device), the data processing server 100 associates a new physical device PD2 with the logical device LD such that the new physical device PD2 is affiliated with the logical device LD, so that service-related information for the provision of services after this replacement can be associated with the physical device PD2. According to this embodiment, replacement of a multifunction peripheral 200 can be adequately and smoothly handled while continuing services on the replacement multifunction peripheral.

Another feature of the present embodiment is that the service-related information includes at least one of order information, points information, coupon information, printing count history information, consumable order information, and tutorial charge information. According to this embodiment, replacement of the multifunction peripheral 200 can be handled adequately and smoothly while continuing services related to the various printing privileges information, printing quantity information, and ordering information on the new multifunction peripheral. Note that in the present disclosure includes the phrase "at least one of A, B and C" as an alternative expression that means one or more of A, B and C. In other words, the phrase "at least one of A, B, and C" in the present disclosure means "(A), (B), (C), (A and B), (A and C), (B and C) or (A, B and C)".

Another feature of this embodiment is that the service-related information includes a tutorial charge plan, which is a free printing privilege for a predetermined amount of printing that is offered at the time the multifunction peripheral 200 was purchased. According to the present embodiment, if the predetermined printing quantity guaranteed by the tutorial charge plan for the MFP 1, for example, has not been completely used at the time the MFP 1 is replaced with the MFP 2, the services guaranteed by the tutorial charge plan can continue to be executed on the replacement MFP 2.

Another feature of the present embodiment is that, if some of the executable print quantity charged through application of the tutorial charge plan for the MFP 1, for example, still remain at the time of replacing the MFP 1, a transfer coupon for the remaining charged executable prints guarantees that the same printing quantity as the remaining charged executable prints can be performed on the MFP 2. According to the present embodiment, the same services as those guaranteed for the MFP 1 by the tutorial charge plan can continue to be executed on the MFP 2.

<6. Variations of the Embodiment>

While the invention has been described in detail with reference to specific embodiments thereof, it would be apparent to those skilled in the art that many modifications and variations may be made therein without departing from the spirit of the invention, the scope of which is defined by the attached claims. Some possible variations are described below in detail, wherein like parts and components are designated with the same reference numerals and duplicate descriptions are omitted or simplified as appropriate.

<6-1. When a Replacement Device is Immediately Shipped Before the Malfunctioning MFP is Returned>

In the embodiment described above, when a failure occurs on the multifunction peripheral 200 currently in use, the user first sends the malfunctioning device to a repair center and then a replacement device is shipped to the user once preparations for reconfiguration have been completed. Consequently, there is a period in which the user is without a multifunction peripheral 200 and unable to utilize the printing service until the replacement device arrives, thereby inconveniencing the user.

The present variation addresses this issue by immediately shipping a replacement device to the user when a malfunction is detected on the current multifunction peripheral 200, thereby enabling the user to resume use of the printing service as quickly as possible. However, in this case a system reconfiguration needs to be performed before the repair center can confirm the remaining number of executable prints on the failed device, as performed in the embodiment described above, and this remaining number of executable prints can no longer be guaranteed to the user. For this reason, replacement of a failed multifunction peripheral with a replacement device is treated just like a new service contract, with a new tutorial charge plan being provided separately to guarantee the user the remaining printable quantity from the failed device.

Figure 12A:
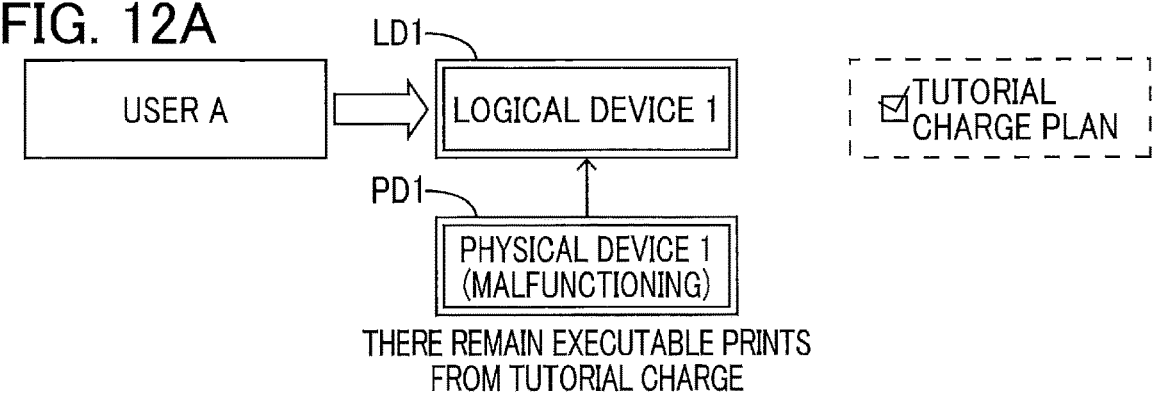
FIGS. 12A to 12C are views for explaining a failed multifunction peripheral replacement sequence when a replacement device is immediately shipped before the multifunction peripheral is returned.
Figure 12B:
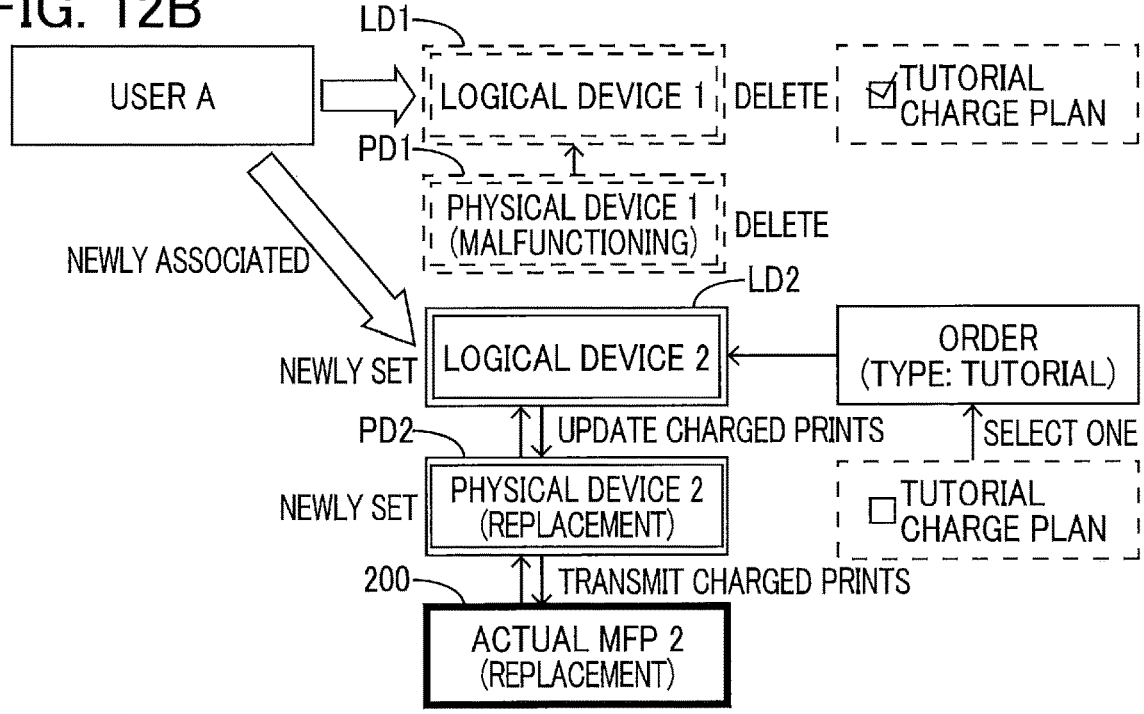

FIG. 12A show a specific example for a case in which the remaining number of charged executable prints in the physical device PD1 for the failed device is equivalent to that in the original tutorial charge plan. Thus, in order to immediately ship a replacement device to the user so that the user can immediately resume use of the printing service, the data processing server 100 generates a new setup including a physical device PD2 and a logical device LD2 separately from the setup of the physical device PD1 and logical device LD1 to which the failed device is affiliated, as illustrated in FIG. 12B. The replacement device is affiliated with the new physical device PD2 and logical device LD2. The data processing server 100 temporarily associates both setups with user A in order to enable user A to utilize the printing service as soon as the shipped replacement device arrives.

Thus, the data processing server 100 generates not only a new physical device PD but also a new logical device LD to support the replacement device, enabling a new tutorial charge plan, which nominally can be applied only once to one logical device LD, to be set separately for use on the replacement device. In this case, required reference information is also copied to the logical device LD2 for the replacement device from the logical device LD1 of the failed device. By applying the newly established tutorial charge plan to the logical device LD2 corresponding to the replacement device, as described above, user A can quickly resume use of the printing service. In other words, the tutorial charge plan can be applied twice in this variation. After the printing service has been resumed, the data processing server 100 deletes the logical device LD1 and physical device PD1 corresponding to the failed device.

Figure 12C:
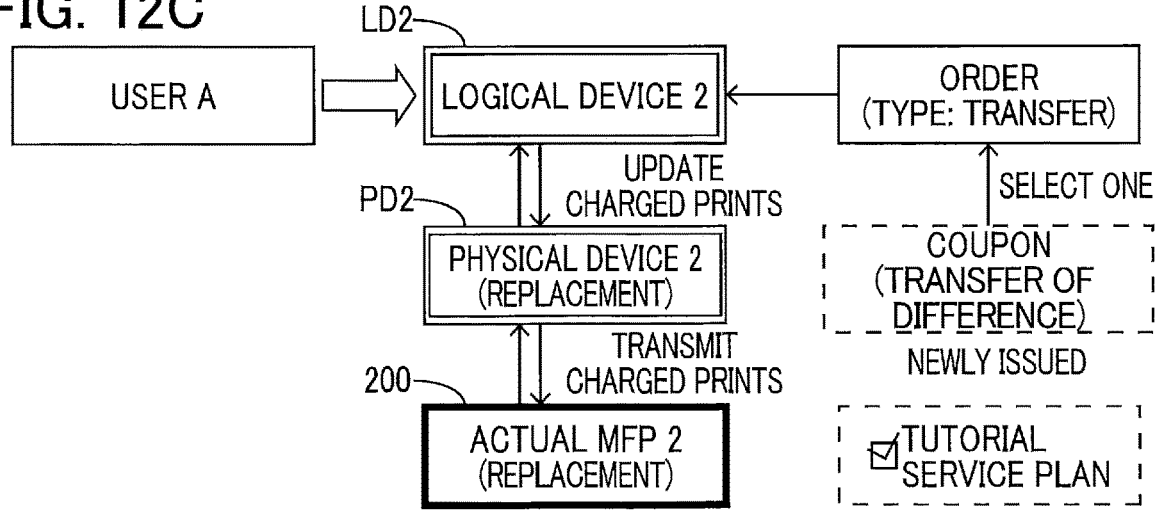

If the failed device is subsequently sent to a repair center and the repair center confirms that actual number of charged executable prints remaining in the failed device is greater than the number corresponding to the single tutorial charge plan, the user must be newly provided with a guarantee for this difference in the number of executable prints. In such a case, as illustrated in FIG. 12C, a transfer coupon that the user can apply free of charge to charge this difference in the number of executable prints is issued to user A and made available for user A to select and apply. In this way, the user can be guaranteed this difference in executable prints.

In this variation, the tutorial charge plan newly set for the replacement device is an example of the second complimentary printing privilege. The number of executable prints that the user can charge using the newly set tutorial charge plan is an example of the printing quantity guaranteed by the second complimentary printing privilege. The difference in the number of executable prints that the user can charge using the transfer coupon is an example of the guarantee printing quantity. The process to determine this difference in the number of executable prints is an example of the (g) determining.

As described above, if a portion of the charged remainder from a tutorial charge plan still remains for use on an MFP 1 when the MFP 1 is being replaced and service is being transferred to a replacement device, the data processing server 100 in the present variation guarantees that the charged remainder can be printed on the new MFP 2 by issuing a transfer coupon for the charged remainder. The guaranteed printing quantity is determined based on the charged remainder and a new printing quantity guaranteed by the new tutorial charge plan for the replacement device. According to this variation, the same service as that guaranteed by the initial tutorial charge plan for the MFP 1 can continue to be executed on the MFP 2.

<6-2. When Setting Up a Transfer-Exclusive Tutorial Charge Plan>

In the first variation described above, a new logical device LD2 is established for the replacement device according to the principle that a tutorial charge plan can only be applied to one logical device LD. However, if priority is given to avoiding the changing of logical devices LD when an MFP is replaced, a transfer-exclusive tutorial charge plan may be newly set up for a replacement device when replacing a failed device and may be applied to the original logical device LD1.

Figure 13A:
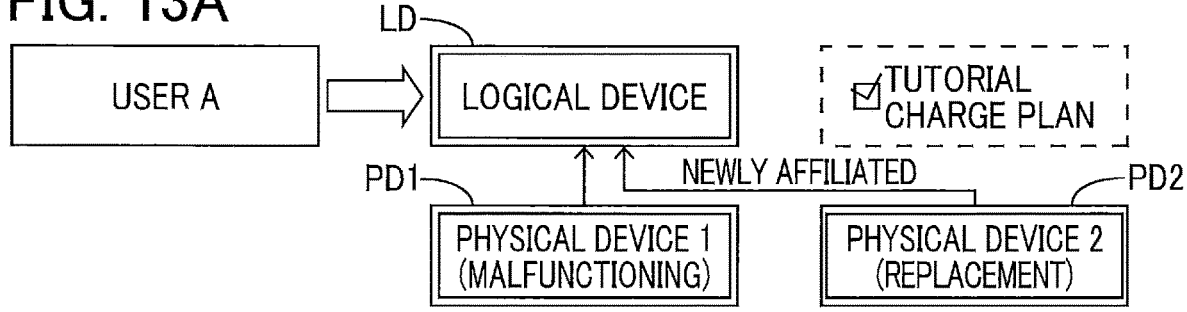
FIGS. 13A to 13C are views for explaining a are views for explaining a failed multifunction peripheral replacement sequence when setting up a transfer-exclusive tutorial charge plan.
Figure 13B:
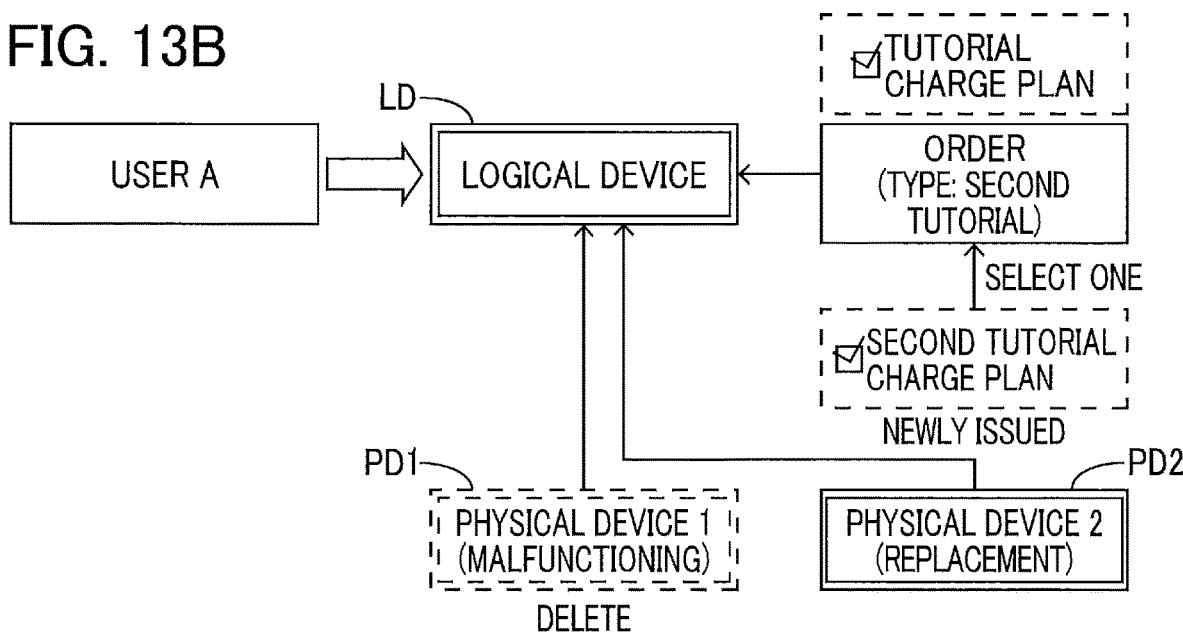
Figure 13C:
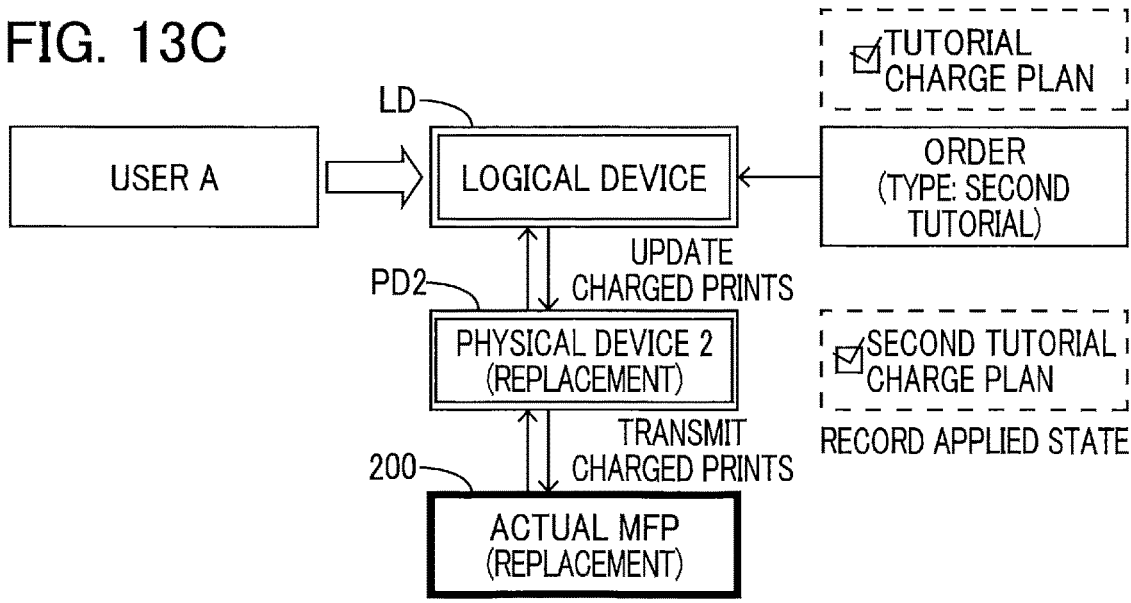

In this case, a physical device PD1 for the failed device and a physical device PD2 for the replacement device are both temporarily affiliated with a common logical device LD, as illustrated in FIG. 13A. Next, the data processing server 100 sets up a new transfer-exclusive second tutorial charge plan separately from the previously applied tutorial charge plan, as shown in FIG. 13B. The second tutorial charge plan can be applied to the logical device LD. Of the two physical devices PD1 and PD2 affiliated with the logical device LD, the affiliation of the physical device PD2 is maintained at this time while the physical device PD1 is deleted. This enables the user to quickly charge the replacement MFP 2 using the second tutorial charge plan in order to resume printing services, as shown in FIG. 13C.

Since tutorial charge plans and coupons have a common feature of being able to charge a predetermined number of executable prints at no cost, a coupon for charging the same number of executable prints may be issued in place of the transfer-exclusive tutorial charge plan described above. In this variation, the process to delete the physical device PD1 while maintaining the affiliation of the physical device PD2 with the logical device LD is an example of the (b) updating.

In the data processing server 100 according to the variation described above, the processor 110 handles the multifunction peripheral 200 using a physical device PD identified by the model name and serial number information 134, and a logical device LD identified by the ID information 133. The physical device PD is a concept associated with the individual device information for the multifunction peripheral 200. The logical device LD is a concept associated with service-related information for the provision of services utilizing the multifunction peripheral 200. The user's account is linked to the logical device LD, which is associated with the service-related information.

When an MFP 1 malfunctions and is replaced with a new MFP 2, for example, the services provided to the MFP 1 are passed on to the MFP 2. In this variation, a physical device PD2, which is separate from the physical device PD1 for the MFP 1, is generated for the MFP 2 when replacing devices and transferring services to the MFP 2. When transferring services to another device in this variation, the previous association that until now was formed between the logical device LD and the physical device PD1 is discarded, and a new association is established between the logical device LD and the physical device PD2.

The data processing server 100 according to the present variation views a multifunction peripheral 200 conceptually as being divided into a logical device LD associated with service-related information and a physical device PD associated with individual device information. When the multifunction peripheral 200 is replaced and services are transferred to a new device, the data processing server 100 associates a new physical device PD2 with the original logical device LD. Thus, the present variation can adequately and smoothly support the continuation of services on multifunction peripherals 200 while one multifunction peripheral 200 is replaced with another.

The sequences of steps shown in FIGS. 7 through 13 and the like in the above description do not limit the present invention to the steps indicated therein. Steps may be added or deleted, or their order may be rearranged, without departing from the spirit and technical ideas of the disclosure.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents.

What is claimed is:

1. An information processing apparatus comprising:
   a communication interface for communicating with a printing device via a network, the printing device being configured to print on a printing medium;
   a controller configured to perform a service provision process for providing a service utilizing the printing device, the controller being configured to perform the service provision process using individual device information of the printing device and contract identification information associated with both the individual device information and service information related to provision of the service, the contract identification information being assigned for each service contract,
   the service provision process including:
   (a) registering a user in association with contract identification information associated with individual device information of a first printing device;
   (b) while the service is provided, updating the service information and the individual device information of the first printing device in association with the contract identification information associated with the user registered in the (a) registering;
   (c) when the first printing device is replaced with a second printing device and the provision of the service is continued utilizing the second printing device,
      discarding the association of the individual device information of the first printing device updated in the (b) updating with the contract identification information associated with the user registered in the (a) registering, and
      associating individual device information of the second printing device with the contract identification information associated with the user registered in the (a) registering; and
   (d) while the continued service is provided, updating the service information and the individual device information of the second printing device in association with the contract identification information associated with the user registered in the (a) registering.

2. The information processing apparatus according to claim 1,
   wherein the service provision process further includes:
   (e) registering first service information, as the service information, in association with the contract identification information, the first service information being information related to provision of the service utilizing the first printing device;
   (f) after the first printing device is replaced with the second printing device, generating second service information corresponding to unused service information included in the first service information, the second service information being information related to provision of the service after the first printing device is replaced with the second printing device; and
   (g) registering, in place of the first service information, the second service information in association with the contract identification information.

3. The information processing apparatus according to claim 2,
   wherein each of the first service information and the second service information includes at least one of:
   paid-printing authorization information indicative of a printing authorization that the user has acquired by paying therefor;
   free-printing authorization information indicative of a printing authorization granted to the user free of charge;
   device-printing authorization information indicative of a printing authorization granted to a corresponding printing device of the first printing device and the second printing device;
   printing quantity information indicative of a quantity already printed under the service utilizing the corresponding printing device; and
   consumable order information for consumables for the corresponding printing device.

4. The information processing apparatus according to claim 3,
   wherein the free-printing authorization information includes a complimentary printing privilege for a predetermined amount of printing, the complimentary printing privilege being granted to the corresponding printing device as the device-printing authorization information at the time of the purchase of the corresponding printing device.

5. The information processing apparatus according to claim 4,
   wherein the first service information includes a first complimentary printing privilege granted to the first printing device as the device-printing authorization information,
   wherein the service provision process further includes:
   (h) when the first printing device is replaced with the second printing device and the service is continued utilizing the second printing device, acquiring, as the unused service information, an unprinted quantity equivalent to an unused part of the first complimentary printing privilege granted to the first printing device, and
   wherein the second service information registered in the (g) registering in association with the contract identification information includes a second device-printing authorization guaranteeing a printing quantity equivalent to the unprinted quantity acquired in the (h) acquiring.

6. The information processing apparatus according to claim 4,
   wherein the first service information includes a first complimentary printing privilege granted to the first printing device as the device-printing authorization information,
   wherein, in response to the first printing device being replaced with the second printing device, a second complimentary printing privilege guaranteeing a printing quantity is granted to the second printing device as the device-printing authorization information, separately from the first complimentary printing privilege granted to the first printing device, wherein the service provision process further includes:
- (h) when the first printing device is replaced with the second printing device and the service is continued utilizing the second printing device, acquiring, as the unused service information, an unprinted quantity equivalent to an unused part of the first complimentary printing privilege granted to the first printing device; and
- (i) determining a guarantee printing quantity on the basis of the printing quantity guaranteed by the second complimentary printing privilege and the unprinted quantity acquired in the (h) acquiring, the guarantee printing quantity being a printing quantity to be guaranteed for the second printing device, and wherein the second service information registered in the (g) registering in association with the contract identification information includes a second device-printing authorization guaranteeing the guarantee printing quantity determined in the (i) determining.

7. The information processing apparatus according to claim 1, wherein the individual device information includes at least one of:
- prints remainder information for managing the number of remaining executable prints using the printing device;
- first consumable information for managing a remaining quantity of a consumable in the printing device; and
- second consumable information for managing a status of a consumable in the printing device.

8. An information processing apparatus comprising:
- a communication interface for communicating with a printing device via a network, the printing device being configured to print on a printing medium;
- a controller configured to perform a service provision process for providing a service utilizing the printing device, the controller being configured to perform the service provision process using individual device information of the printing device and contract identification information associated with both the individual device information and service information related to provision of the service, the contract identification information being assigned for each service contract, the service provision process including:
- (a) registering a user in association with contract identification information associated with individual device information of a first printing device;
- (b) while the service is provided, updating the service information and the individual device information of the first printing device in association with the contract identification information associated with the user registered in the (a) registering;
- (c) when the first printing device is replaced with a second printing device due to a malfunction of the first printing device and the provision of the service is continued utilizing the second printing device, updating which includes:
  - maintaining the association of the contract identification information with the user registered in the (a) registering;
  - discarding the association of the individual device information of the first printing device updated in the (b) updating with the contract identification information associated with the user registered in the (a) registering; and
  - associating individual device information of the second printing device with the contract identification information associated with the user registered in the (a) registering; and
- (d) while the continued service is provided, updating the service information and the individual device information of the second printing device in association with the contract identification information associated with the user registered in the (a) registering.

9. The information processing apparatus according to claim 8, wherein the individual device information includes at least one of:
- prints remainder information for managing the number of remaining executable prints using the printing device;
- first consumable information for managing a remaining quantity of a consumable in the printing device; and
- second consumable information for managing a status of a consumable in the printing device.

10. A device management method for an information processing apparatus configured to handle a printing device using individual device information of the printing device and contract identification information associated with both the individual device information and service information related to provision of a service, the contract identification information being assigned for each service contract, the printing device being configured to print on a printing medium, the device management method comprising:
- (a) registering a user in association with contract identification information associated with individual device information of a first printing device;
- (b) while the service is provided, updating the service information and the individual device information of the first printing device in association with the contract identification information associated with the user registered in the (a) registering;
- (c) when the first printing device is replaced with a second printing device due to a malfunction of the first printing device and the provision of the service is continued utilizing the second printing device,
  - discarding the association of the individual device information of the first printing device updated in the (b) updating with the contract identification information associated with the user registered in the (a) registering, and
  - associating individual device information of the second printing device with the contract identification information associated with the user registered in the (a) registering; and
- (d) while the continued service is provided, updating the service information and the individual device information of the second printing device in association with the contract identification information associated with the user registered in the (a) registering.

11. The device management method according to claim 10, wherein the individual device information includes at least one of:
- prints remainder information for managing the number of remaining executable prints using the printing device;
- first consumable information for managing a remaining quantity of a consumable in the printing device; and
- second consumable information for managing a status of a consumable in the printing device.

12. A device management method for an information processing apparatus configured to handle a printing device using individual device information of the printing device and contract identification information associated with both the individual device information and service information related to provision of a service, the contract identification information being assigned for each service contract, the printing device being configured to print on a printing medium, the device management method comprising:

(a) registering a user in association with contract identification information associated with individual device information of a first printing device;

(b) while the service is provided, updating the service information and the individual device information of the first printing device in association with the contract identification information associated with the user registered in the (a) registering;

(c) when the first printing device is replaced with a second printing device due to a malfunction of the first printing device and the provision of the service is continued utilizing the second printing device, updating which includes:

maintaining the association of the contract identification information with the user registered in the (a) registering;

discarding the association of the individual device information of the first printing device updated in the (b) updating with the contract identification information associated with the user registered in the (a) registering; and associating individual device information of the second printing device with the contract identification information associated with the user registered in the (a) registering; and (d) while the continued service is provided, updating the service information and the individual device information of the second printing device in association with the contract identification information associated with the user registered in the (a) registering.

13. The device management method according to claim 12, wherein the individual device information includes at least one of:

prints remainder information for managing the number of remaining executable prints using the printing device;

first consumable information for managing a remaining quantity of a consumable in the printing device; and second consumable information for managing a status of a consumable in the printing device.

* * * * *